United States Patent
Miyake

[11] Patent Number: 6,149,780
[45] Date of Patent: Nov. 21, 2000

[54] WATER ELECTROLYZER HAVING A WATER PRESENCE DETECTOR

[76] Inventor: Haru Miyake, 36-2, Yomogidai 1-chome, Meitou-ku, 465-0091 Nagoya-shi, Japan

[21] Appl. No.: 09/197,828

[22] Filed: Nov. 23, 1998

[30] Foreign Application Priority Data

Aug. 10, 1998 [JP] Japan ................... 10-239545

[51] Int. Cl.[7] .................. C25B 15/00; C25B 9/00
[52] U.S. Cl. .................. 204/228.1; 204/230.2; 204/230.5; 204/230.8; 204/240; 204/263; 204/229.8
[58] Field of Search .................. 204/228, 229, 204/242, 263, 264, 229.8, 230.2, 230.5, 230.8, 240, 228.1; 73/861.09, 861.07, 861.08, 195, 196, 197

[56] References Cited

U.S. PATENT DOCUMENTS

| | | | |
|---|---|---|---|
| 3,841,483 | 10/1974 | Oberton | 210/87 |
| 4,580,904 | 4/1986 | Hackeney | 386/137 |
| 4,810,344 | 3/1989 | Okazaki | 204/228 |
| 5,306,409 | 4/1994 | Arai | 204/228 |
| 5,316,646 | 5/1994 | Arai | 204/306 |
| 5,340,458 | 8/1994 | Koizuma | 204/253 |
| 5,435,894 | 7/1995 | Hayakawa | 204/148 |
| 5,445,722 | 8/1995 | Yamaguti et al. | 204/229 |
| 5,510,009 | 4/1996 | Arai et al. | 205/746 |
| 5,616,250 | 4/1997 | Johnson et al. | 210/695 |
| 5,728,274 | 3/1998 | Kamitani et al. | 204/228 |
| 5,843,291 | 12/1998 | Eki et al. | 204/228 |
| 5,892,159 | 5/1999 | Smith | 73/861.354 |
| 5,985,108 | 11/1999 | Arai | 204/228.1 |

FOREIGN PATENT DOCUMENTS

| | | | |
|---|---|---|---|
| 6-126283 | 5/1994 | Japan . | |
| 40829956 | 4/1995 | Japan | C02F 1/46 |
| 8-39070 | 2/1996 | Japan . | |
| 10183703 | 12/1996 | Japan | E03C 1/10 |

Primary Examiner—Donald R. Valentine
Attorney, Agent, or Firm—Flynn, Theil, Boutell & Tanis, P.C.

[57] ABSTRACT

The invention provides an electrolytic ionized water generator wherein a flow meter is installed in a discharge flow path of an acidic water with such constituents as calcium, magnesium, and the like removed, which is generated by electrolytic processing of city water in an electrolytic cell, solving a problem of degradation in precision of the flow meter over time due to adherence of the constituents of city water such as calcium, magnesium, and the like to the flow meter.

9 Claims, 31 Drawing Sheets

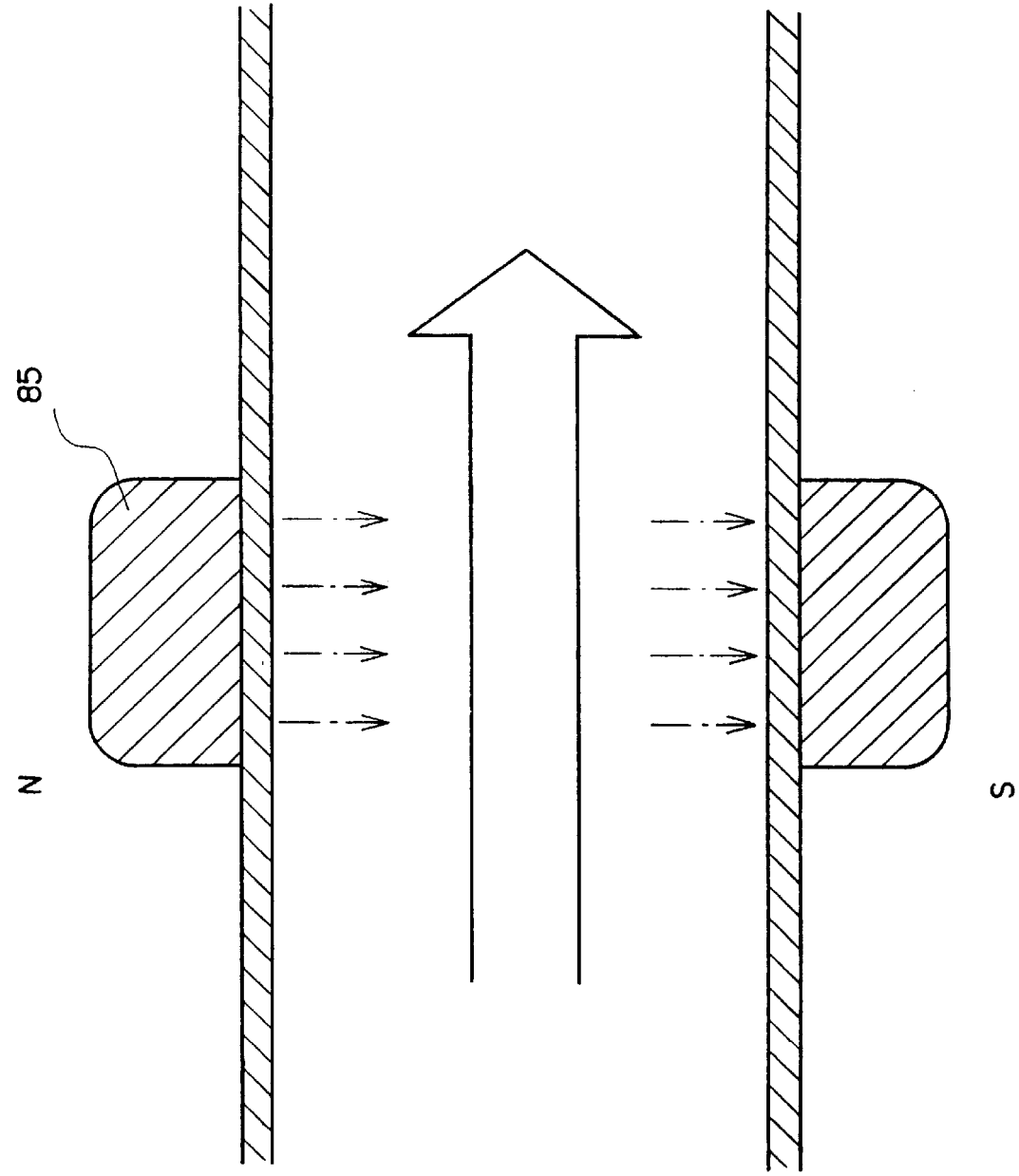

6,149,780

WATER ELECTROLYZER HAVING A WATER PRESENCE DETECTOR

BACKGROUND OF THE INVENTION

1. Field of the Invention

The invention relates to an electrolytic ionized water generator for continuously generating alkaline ionized water of a constant pH value by washing city water (referred to hereinafter as drinking water), and applying electrolytic processing thereto.

2. Description of the Related Art

The applicant of the present invention has so far developed various types of electrolytic ionized water generators as disclosed in, for example, Japanese Patent Laid-open H 6-126283, Japanese Patent Laid-open H 8-15 39070, and so forth.

However, in the electrolytic ionized water generators described above wherein a flow meter for determining an electrolyzation voltage is disposed between a water cartridge and an electrolytic cell, problems to be solved have been encountered. For example, precision of the flow meter degrades over time due to adherence of constituents of drinking water such as calcium, magnesium, and the like to the flow meter, eventually disabling the flow meter from making an accurate measurement of a flow rate.

SUMMARY OF THE INVENTION

In view of the problem of degradation in precision of the flow meter of the conventional electrolytic ionized water generators, it is an object of the invention to provide an electrolytic ionized water generator wherein a flow meter is disposed in a path through which acidic water is discharged so as to enable the flow meter to operate accurately at all times by measuring a flow rate of the acidic water after removal of constituents of drinking water such as calcium, magnesium, and so forth, adhering to the flow meter, thus solving the problem described above.

BRIEF DESCRIPTION OF THE DRAWINGS

FIG. 34 is a vertical sectional view showing a fluid magnetic treatment device in action.

DESCRIPTION OF THE PREFERRED EMBODIMENTS

Figure 1:
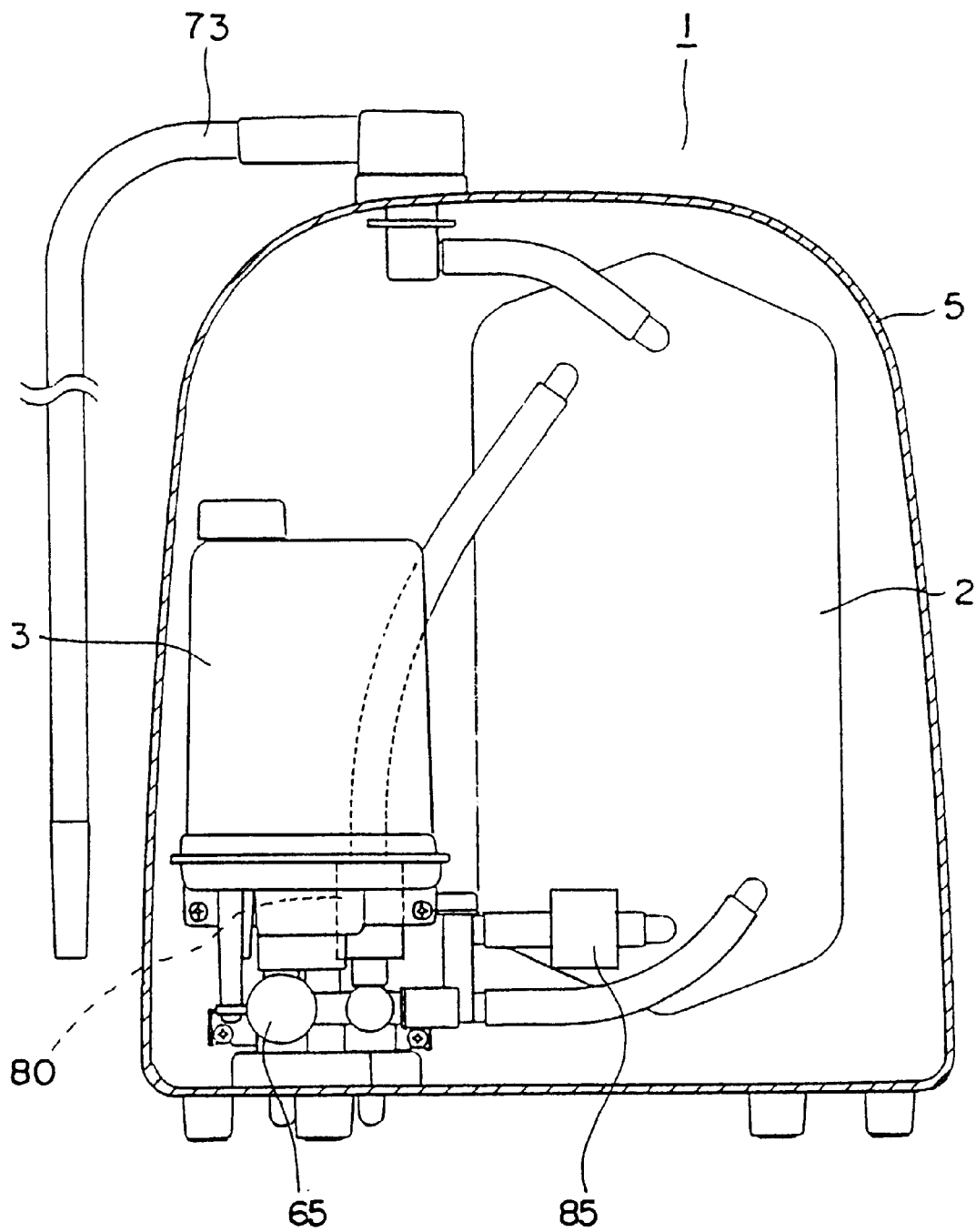
FIG. 1 is an elevation showing the schematic interior construction of an electrolytic ionized water generator according to the invention.
Figure 2:
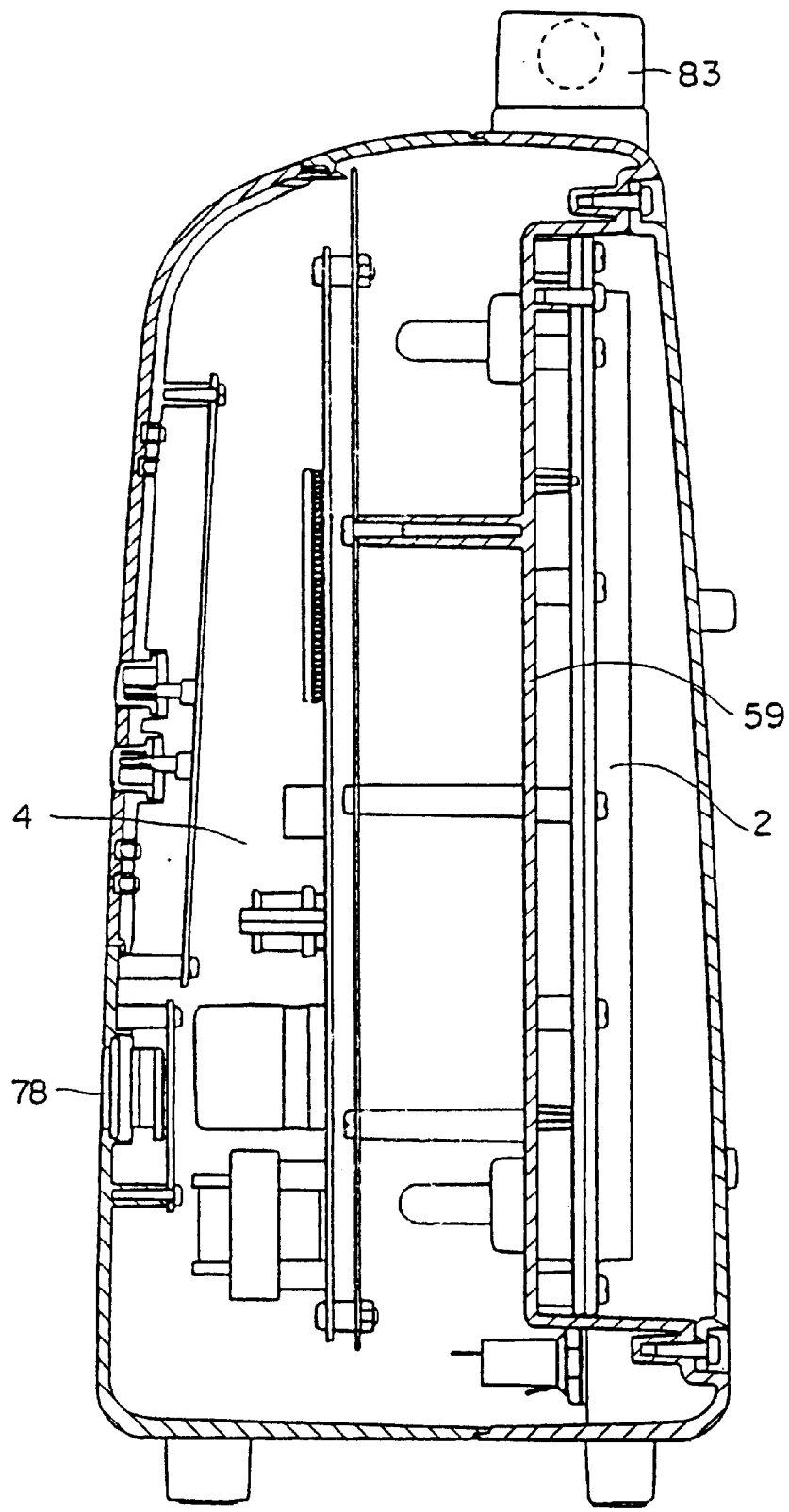
FIG. 2 is a side elevation showing the schematic interior construction of the electrolytic ionized water generator according to the invention.
Figure 3:
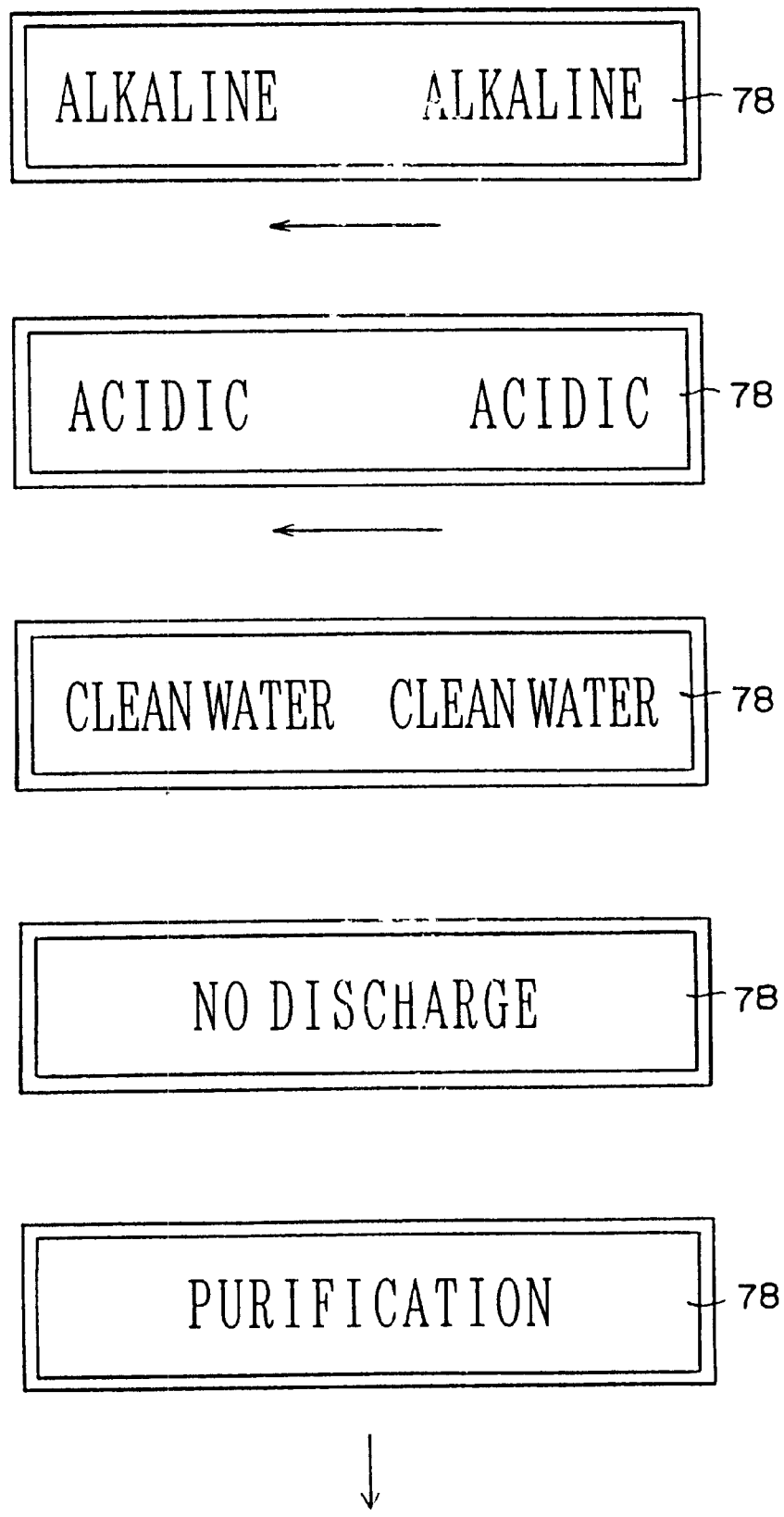
FIG. 3 is a plan view showing lettering made on respective letter display panels.
Figure 4:
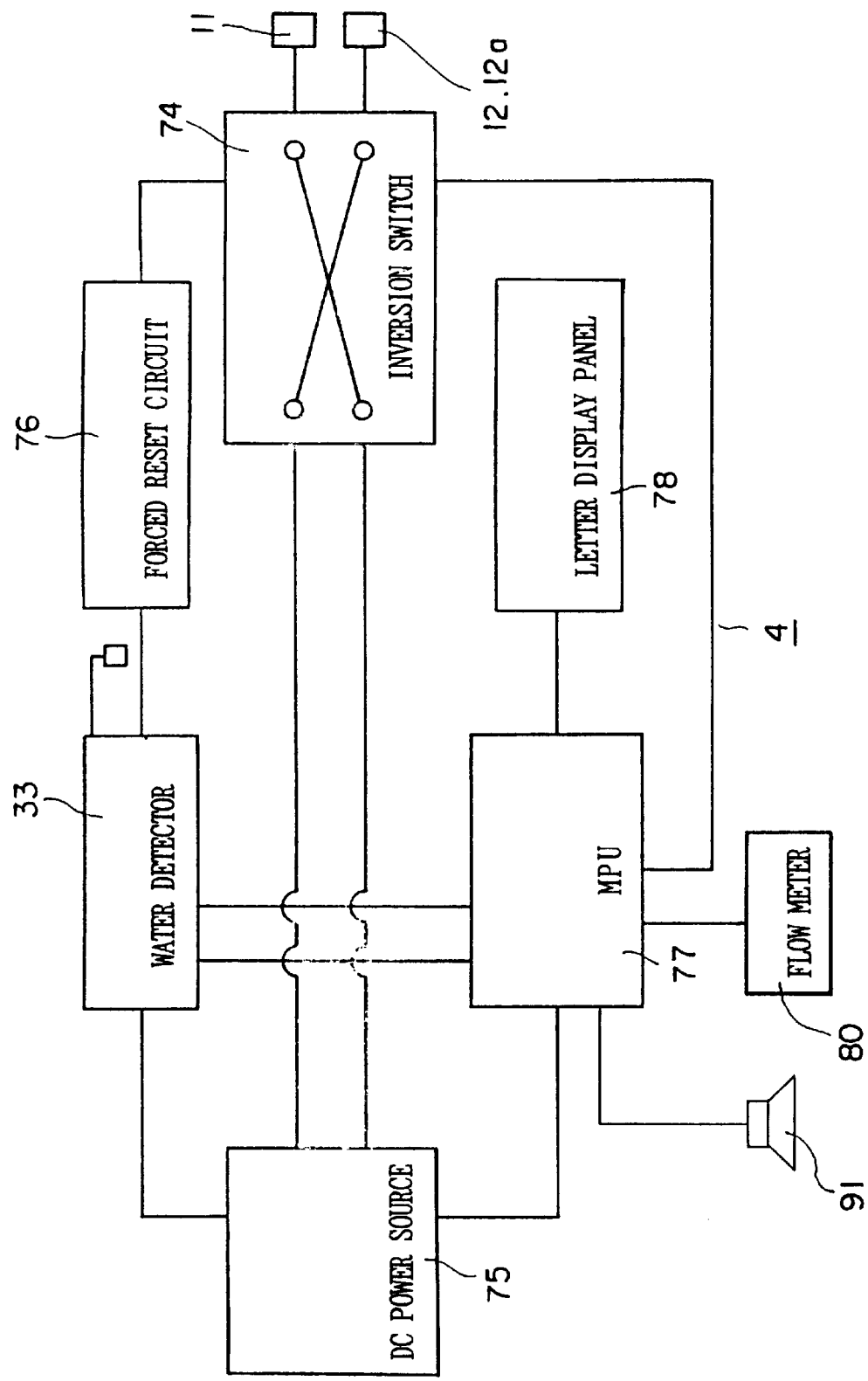
FIG. 4 is a block diagram of a control circuit.
Figure 5:
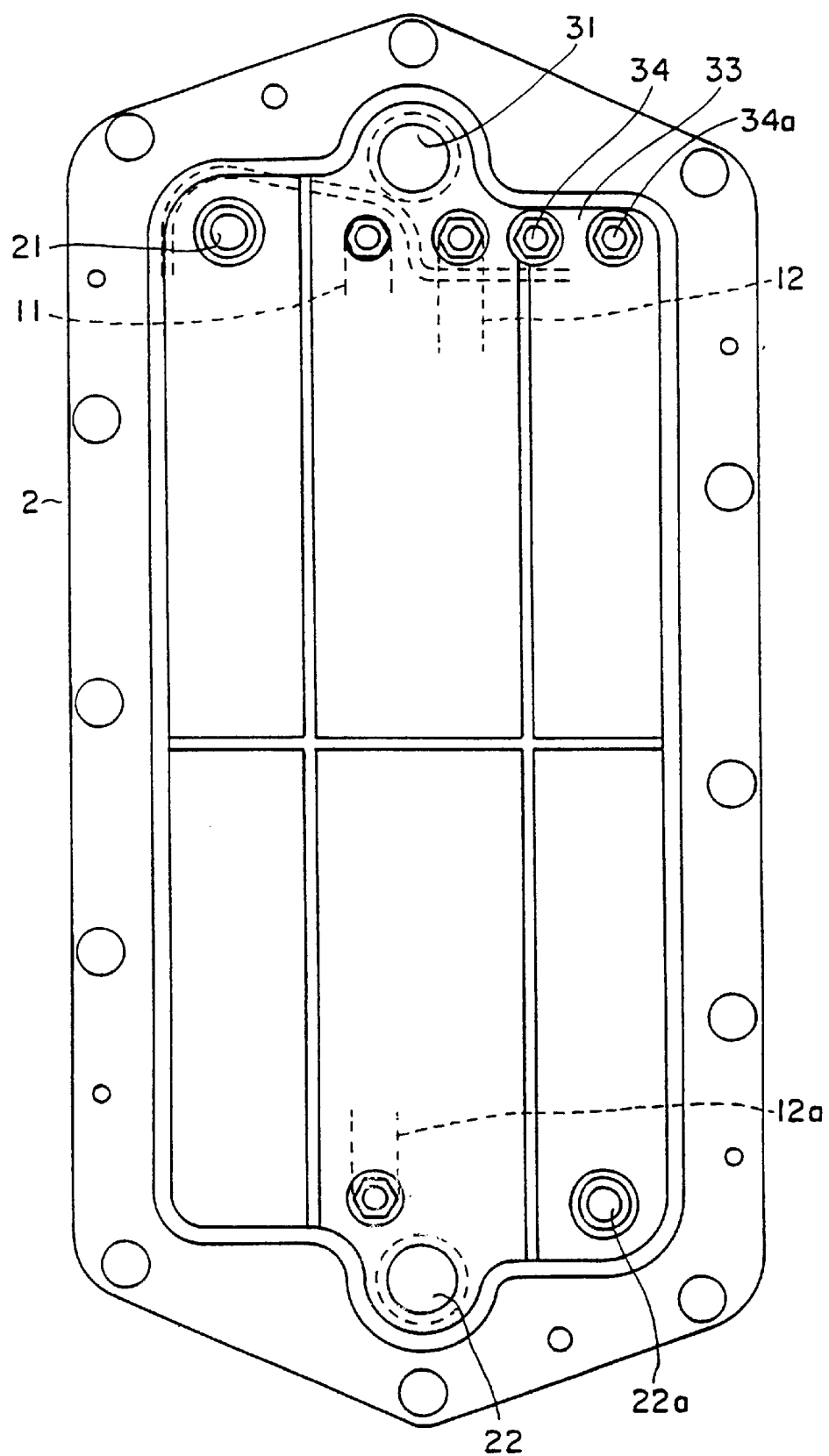
FIG. 5 is an elevation of an electrolytic cell.
Figure 6:
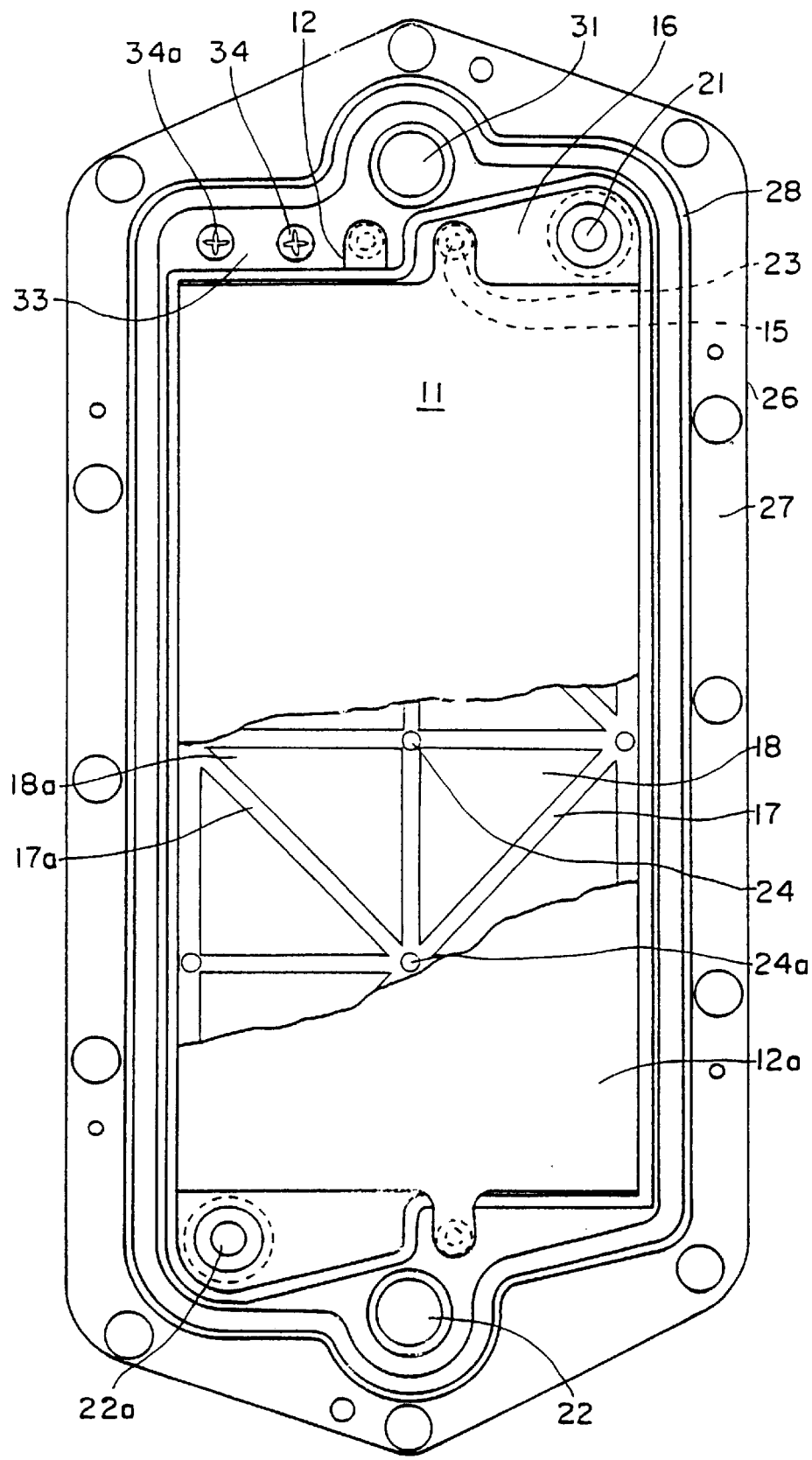
FIG. 6 is a schematic elevation showing the interior construction of the electrolytic cell.
Figure 7:
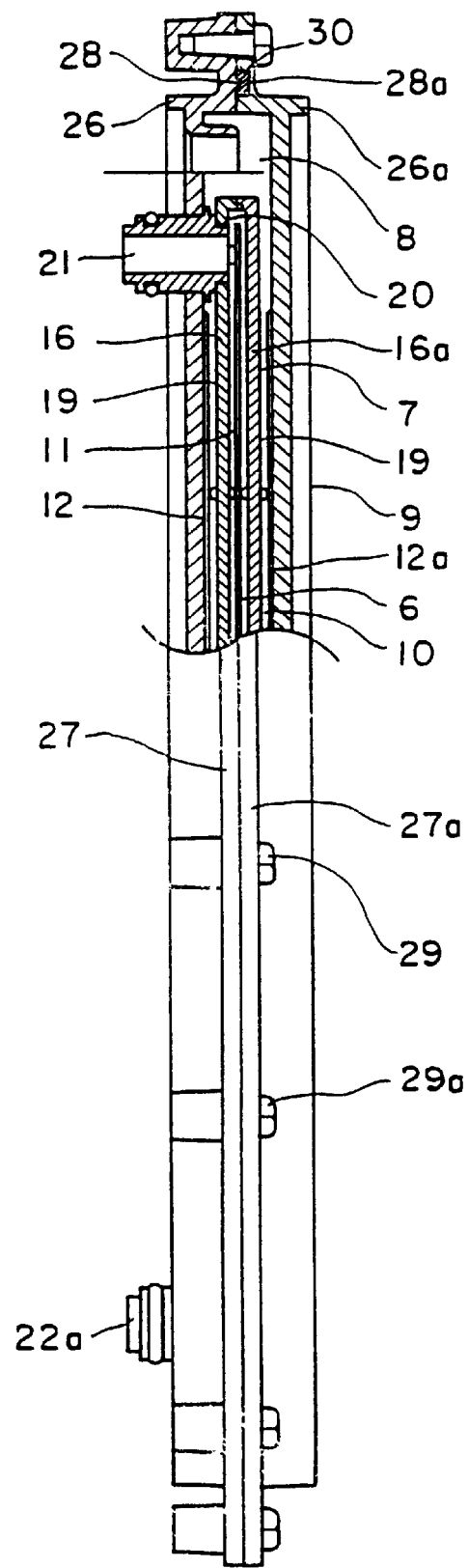
FIG. 7 is a fragmentary side elevation showing a first electrolyzed water outlet of the electrolytic cell.
Figure 8:
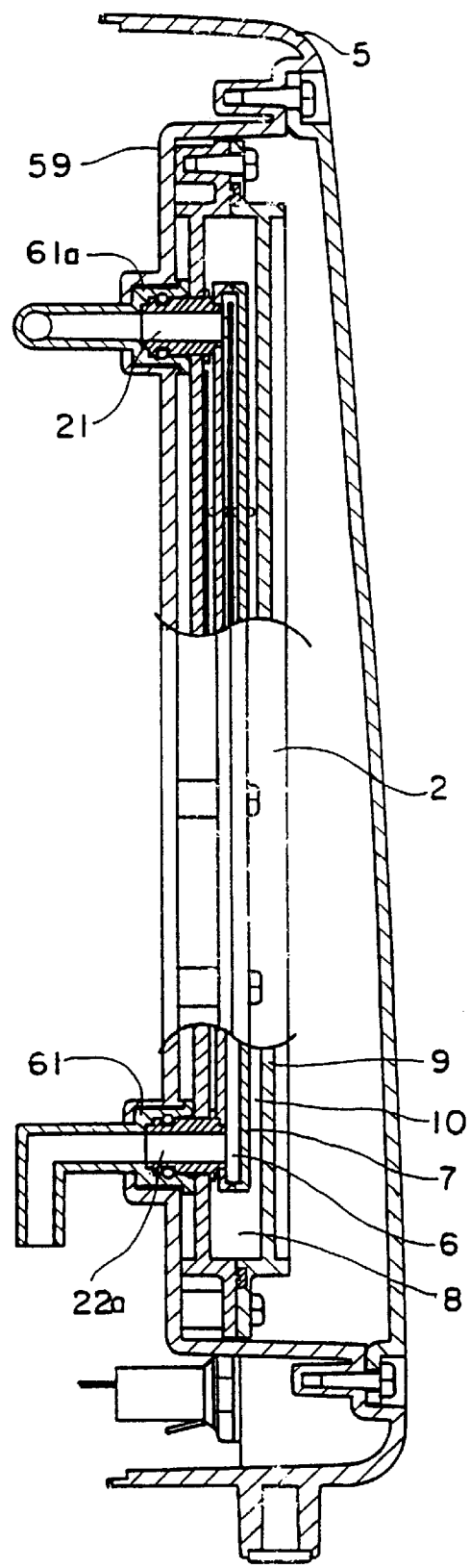
FIG. 8 is a fragmentary side elevation showing connection of the first electrolyzed water outlet of the electrolytic cell, and a drinking water inlet with a second coupling of an enclosure.
Figure 9:
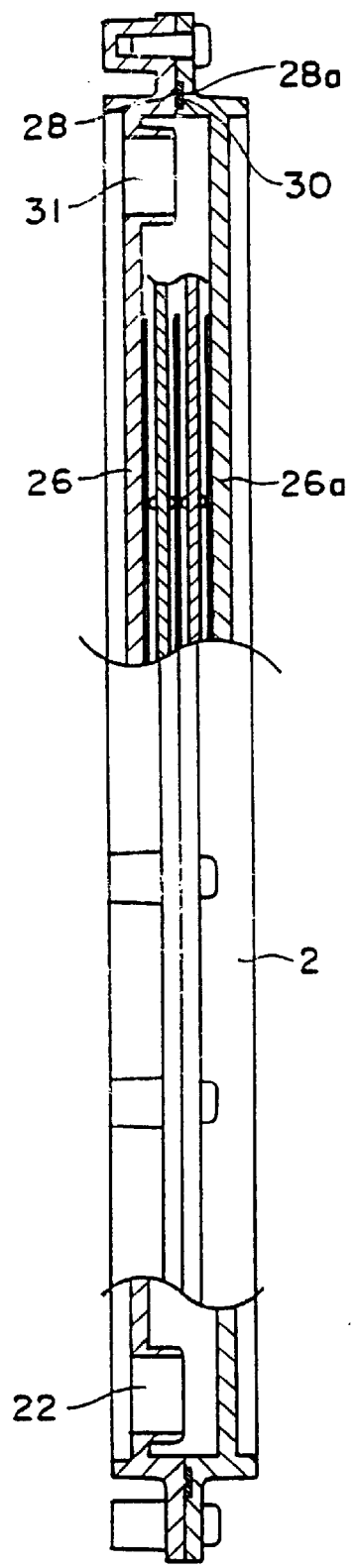
FIG. 9 is a fragmentary side elevation showing a second electrolyzed water outlet of the electrolytic cell.
Figure 10:
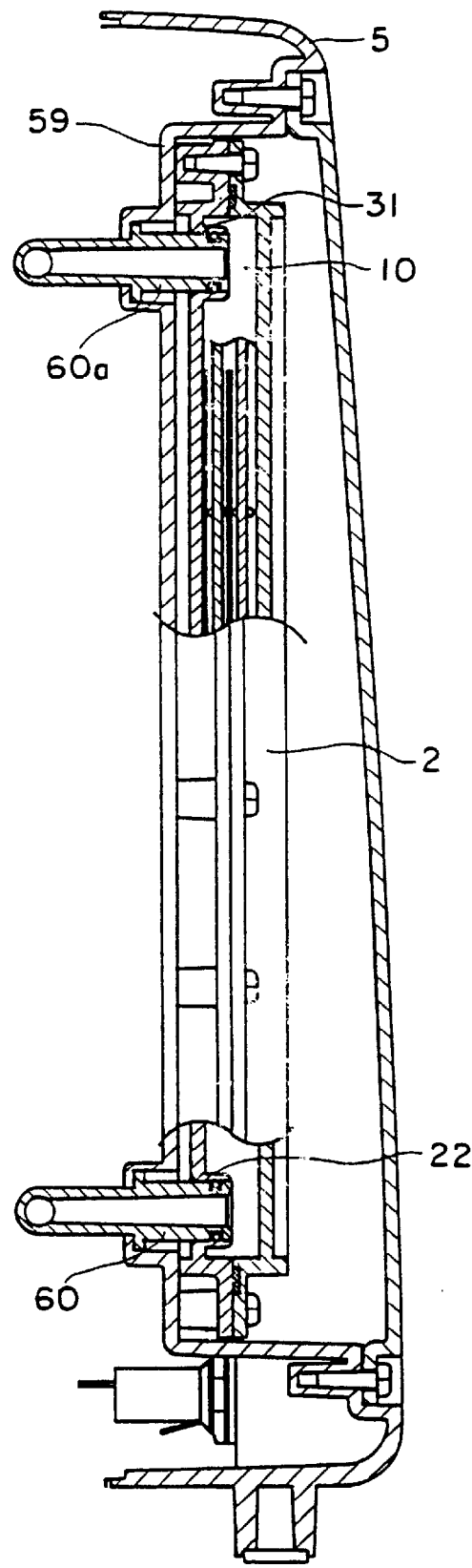
FIG. 10 is a fragmentary side elevation showing connection of the second electrolyzed water outlet of the electrolytic cell and the drinking water inlet with a first coupling of the enclosure.
Figure 11:
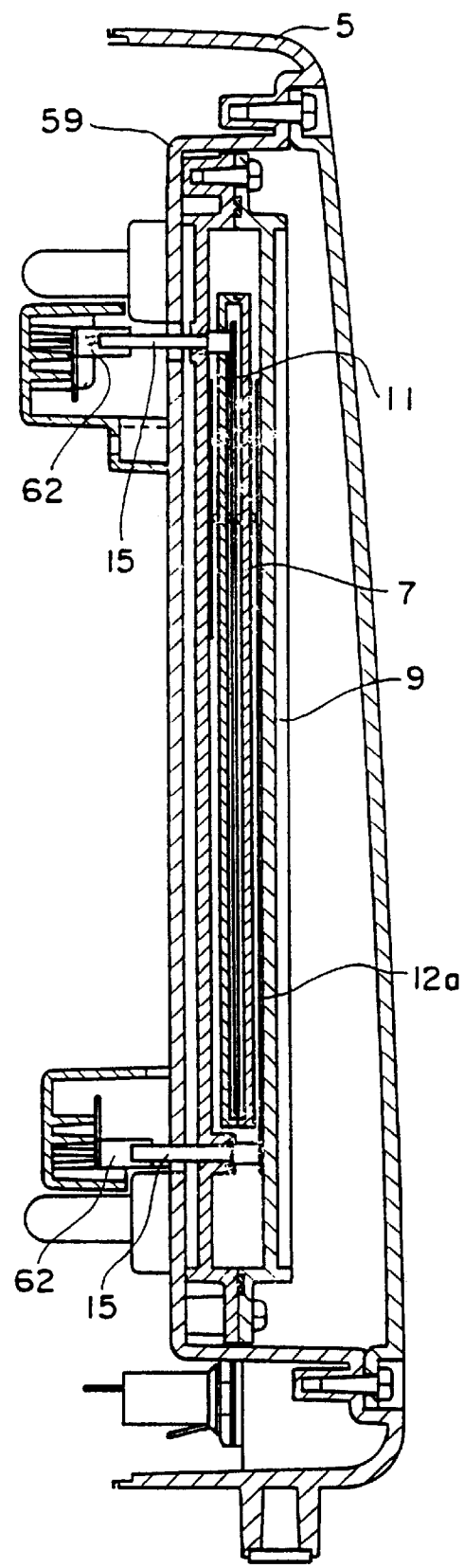
FIG. 11 is a fragmentary side elevation showing connection of a first electrode plate and a second electrode plate, of the electrolytic cell, with connectors of the enclosure.
Figure 12:
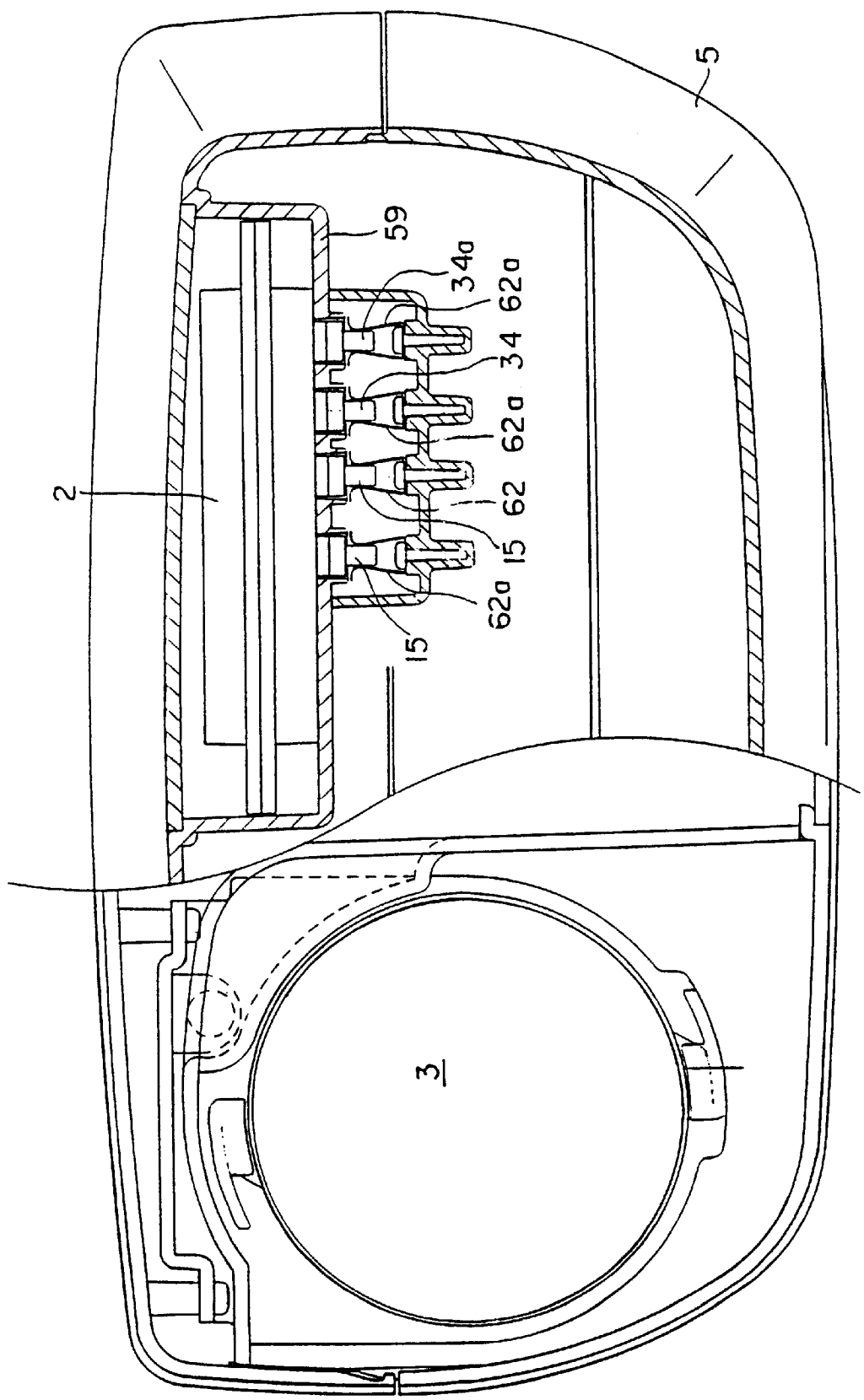
FIG. 12 is a fragmentary sectional view showing other connection points of the electrolytic cell.
Figure 13:
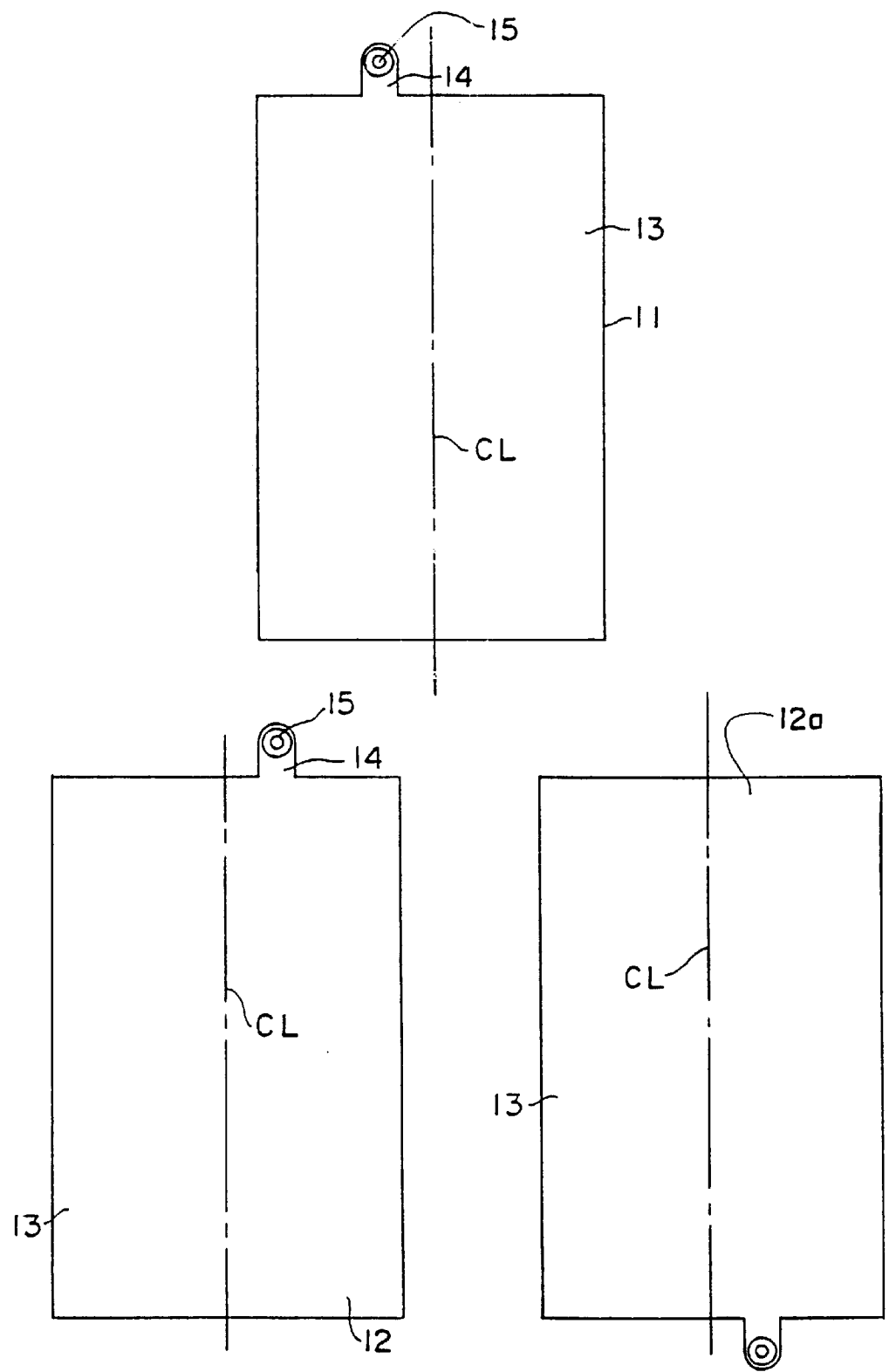
FIG. 13 is a plan view showing the first electrode plate as well as the second electrode plates of the electrolytic cell.
Figure 14:
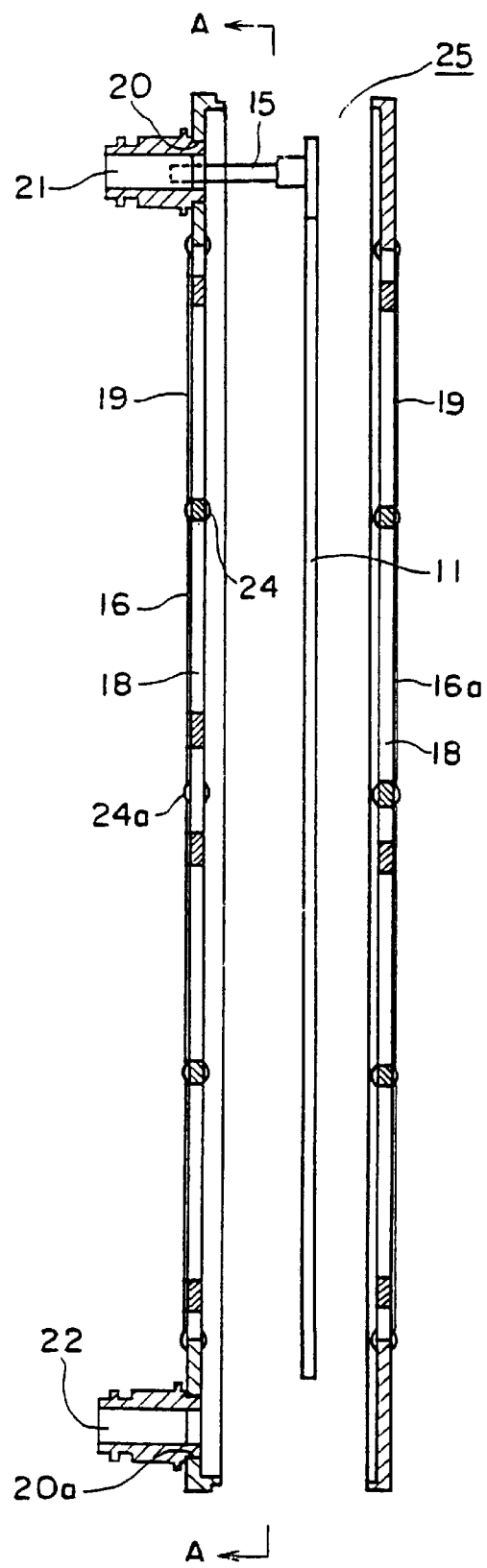
FIG. 14 is an exploded side elevation showing a first electrolyzed water processing part.
Figure 15:
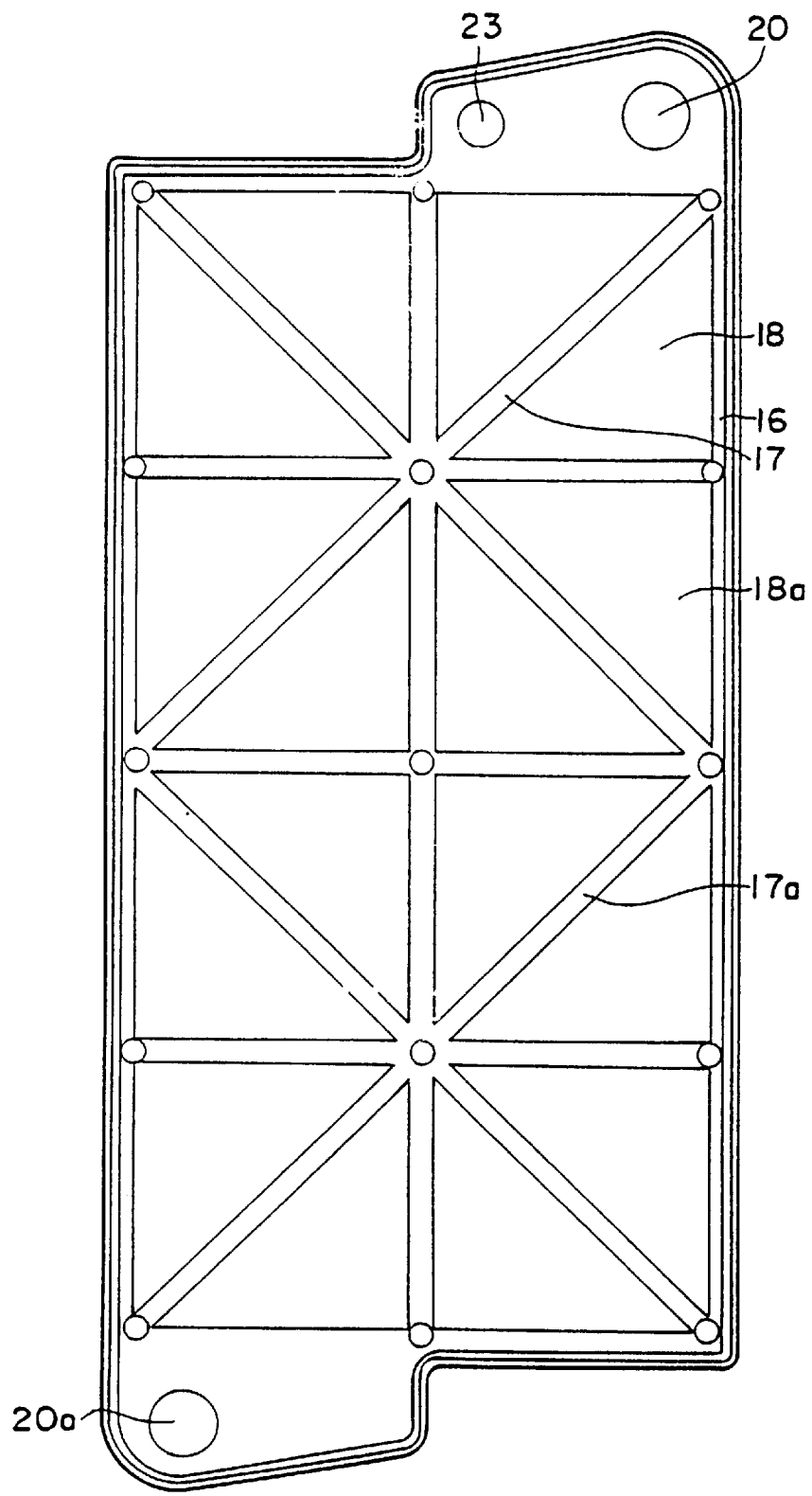
FIG. 15 is a plan view taken along the line A—A of FIG. 14.
Figure 16:
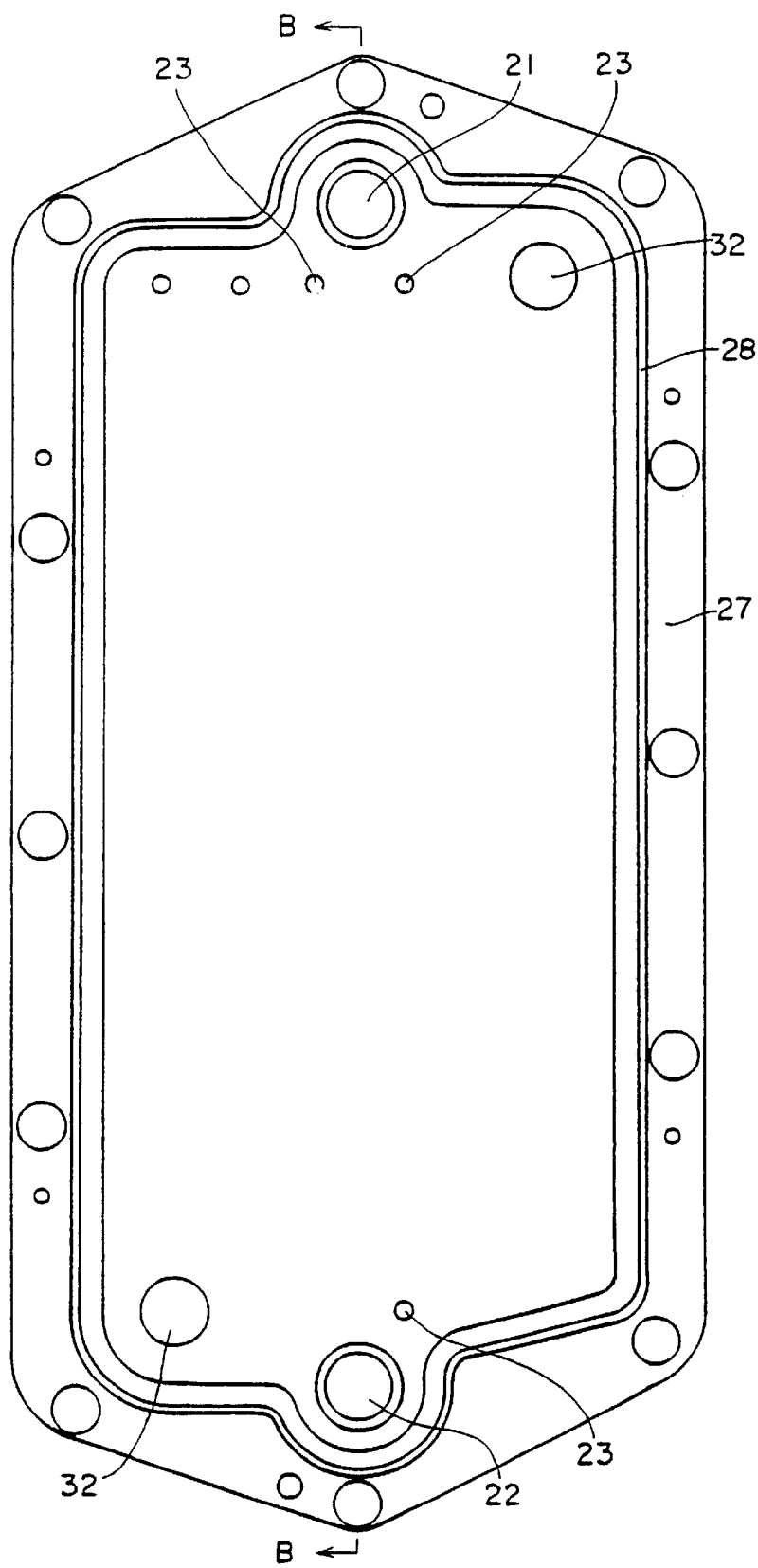
FIG. 16 is a plan view of an outer-box partitioned case inside an outerbox of the electrolytic cell.
Figure 17:
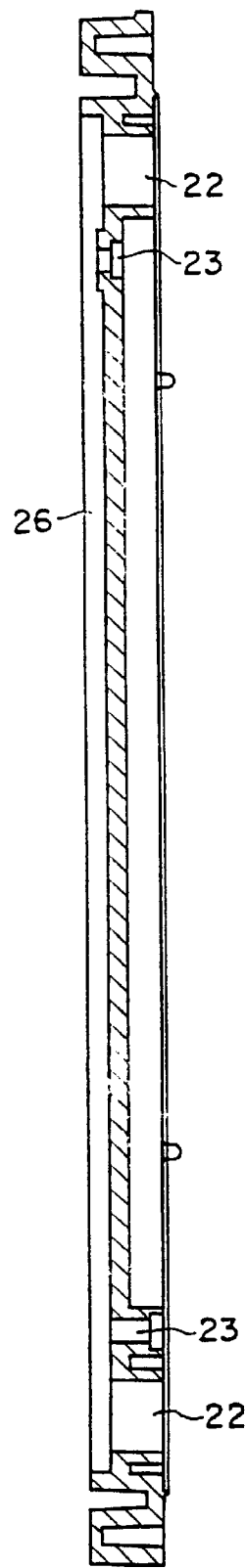
FIG. 17 is a side view taken along the line B—B of FIG. 16.
Figure 18:
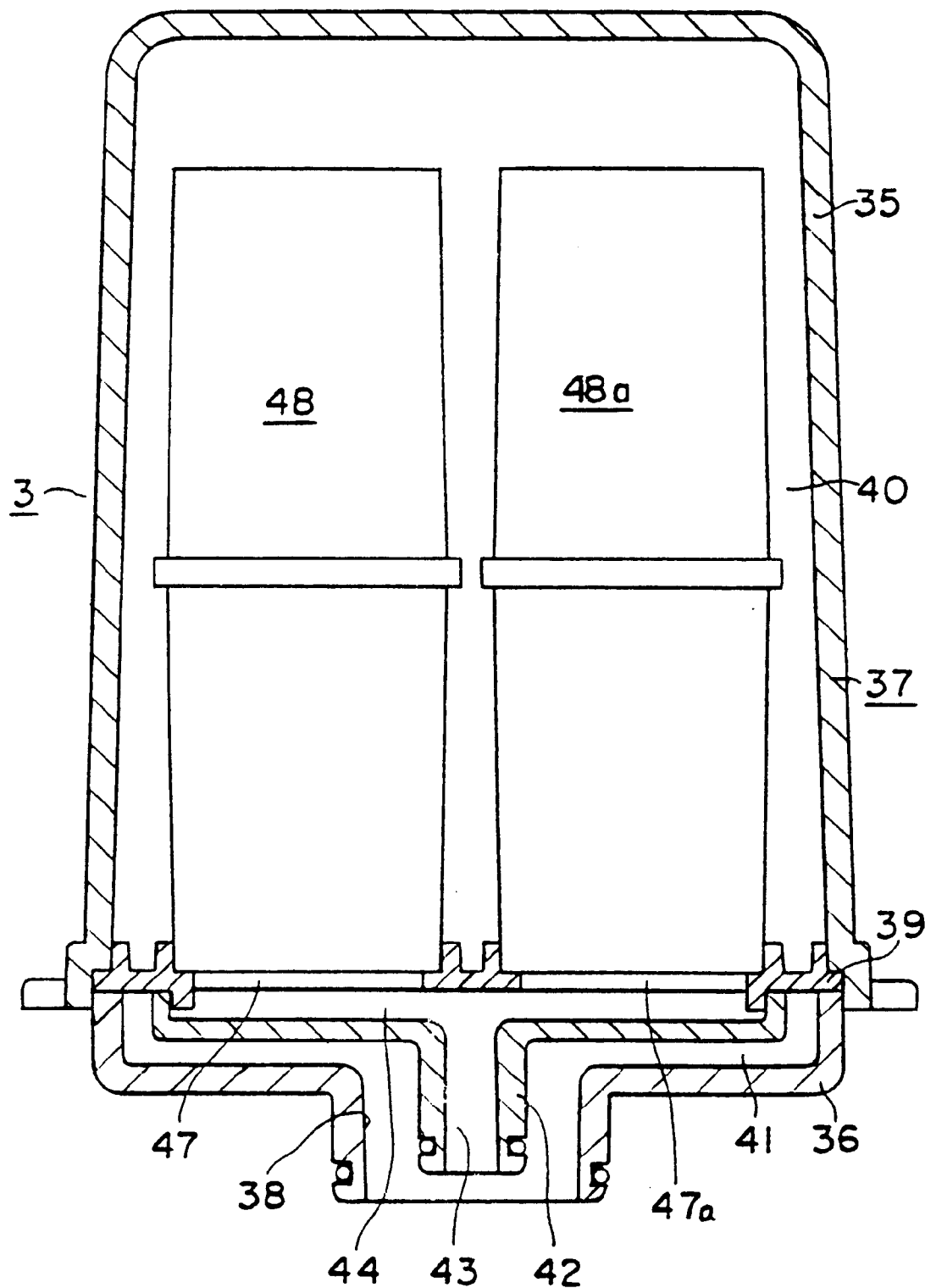
FIG. 18 is an elevation of a clean water cartridge.
Figure 19:
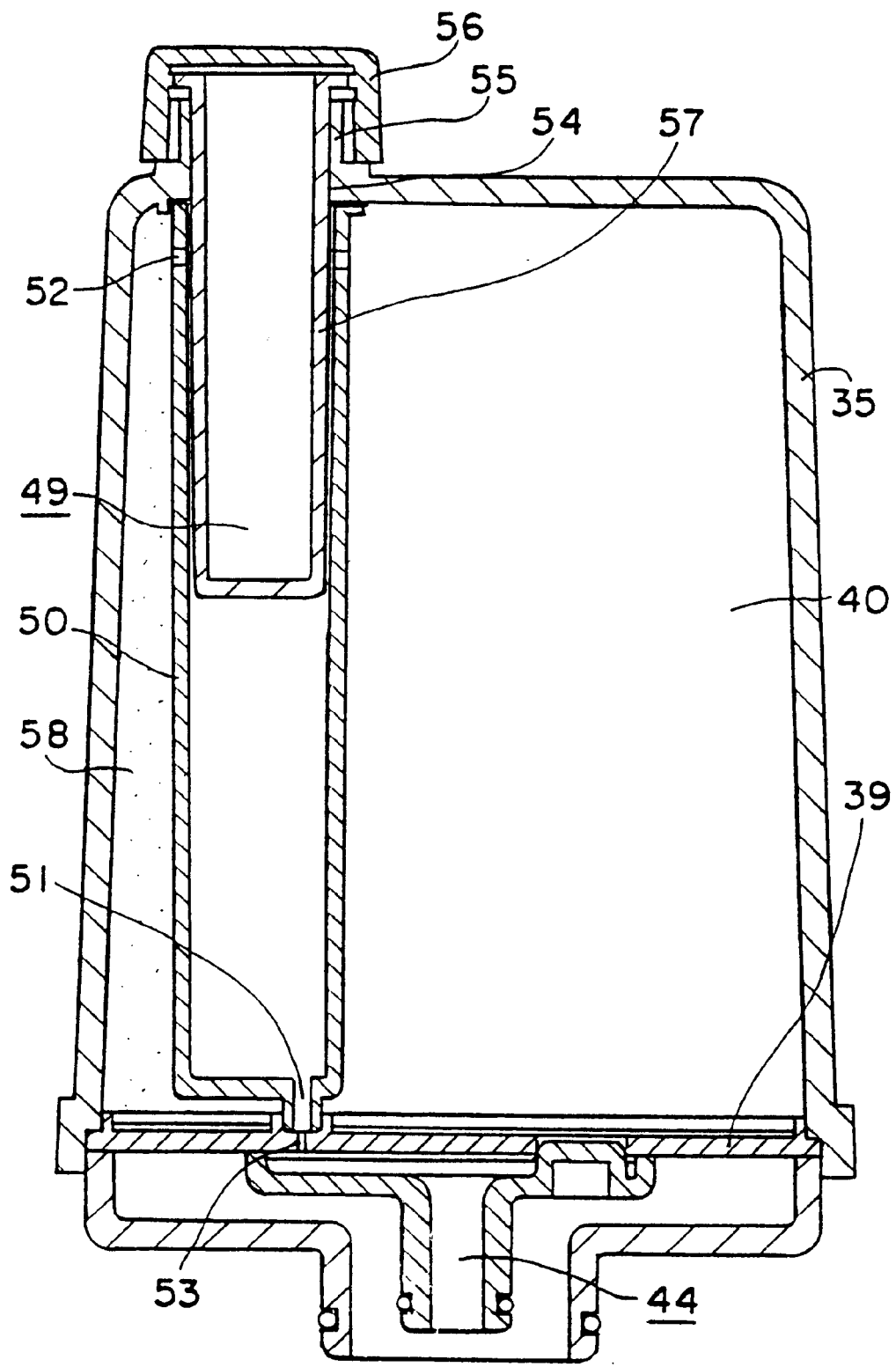
FIG. 19 is a side view of the clean water cartridge.
Figure 20:
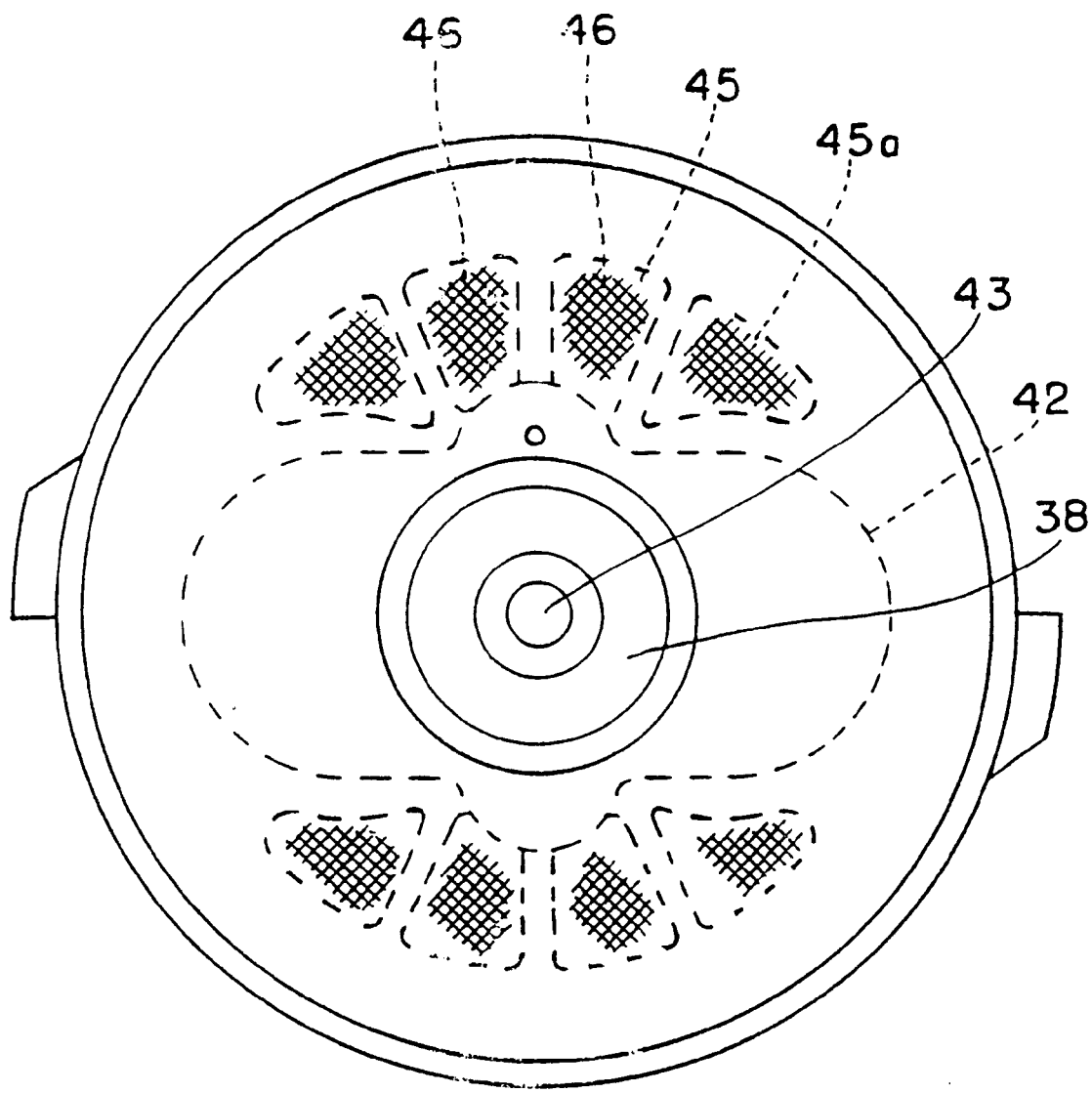
FIG. 20 is a bottom view of the clean water cartridge.

Embodiments of an electrolytic ionized water generator according to the invention are described hereinafter with reference to the accompanying drawings.

Reference numeral 1 denotes an electrolytic ionized water generator according to the invention, and the electrolytic ionized water generator 1 comprises an electrolytic cell 2 for generating an alkaline ionized water and an acidic water, a clean water cartridge 3 for washing water supplied to the electrolytic cell 2, and a control circuit 4 for controlling a voltage applied to the electrolytic cell 2, which are all disposed inside an enclosure case 5.

The cell 2 consists of an inner box 7 wherein a first electrode chamber 6 is defined, and an outer box 9 wherein an electrolytic chamber 8 is defined. The inner box 7 is installed inside the outer box 9, and a space formed between the inner box 7 and the outer box 9 constitutes a second electrode chamber 10. Meanwhile, a first electrode plate 11, and second electrode plates 12, 12a, made of such material as ferrite, stainless steel, titanium, or the like, and formed in the same shape, are disposed in the first electrode chamber 6, and the second electrode chamber 10, respectively.

As for the shape of the first electrode plate 11, and the second electrode plates 12, 12a, the first electrode plate 11 is formed by integrally extending an electrode holding piece 14 from one side of an electrode main body 13 in the shape of a rectangular plate, at an off-center point a predetermined length away from the widthwise center CL (in transverse direction) thereof, and by welding an electrode bar 15 on the front surface of the electrode holding piece 14 so as to set the electrode main body 13 upright while the second electrode plates 12, 12a are formed in a similar fashion by welding an electrode bar 15 on the back surface of an electrode holding piece 14, setting an electrode main body 13 upright, respectively.

In this embodiment, titanium is used as material for the first electrode plate 11, and the second electrode plates 12, 12a, and surface treatment, for example, plating with material impervious to ionization such as platinum alloy, and the like is applied thereto to further prolong the service life time of the electrodes.

In the inner box 7, the first electrode chamber 6 on the inner side, substantially in the shape of a rectangular parallelepiped, is formed by two inner-box partitioned-cases 16, 16a, and a multitude of through-holes 18, 18a are formed at the side of the inner-box partitioned-cases 16, and 16a, respectively, facing each other, with ribs 17, 17a, formed in a triangular-patterned grid-like fashion. Further, a diaphragm 19 is attached to the external side of the through-holes 18, 18a, thereby forming the inner box 7 provided with the diaphragm 19 on the front face as well as the back face thereof.

Attachment ports 20, 20a are formed diagonally opposite from each other, in the upper part and lower part, respectively, of one side of one of the inner-box partitioned-cases, 16 enclosed inside the inner box 7. A first electrolyzed water outlet 21 in tubular form is connected to the attachment port 20 in the upper part while a drinking water inlet 22 in the same form is connected to the attachment port 20a in the lower part, and an electrode through-hole 23 for allowing the electrode bar 15 of the first electrode plate 11 to be penetrated therethrough is bored in the upper part of the same side of the inner-box partitioned-case 16.

The electrode bar 15 of projects externally through the electrode through-hole 23 of the inner-box partitioned-case 16, and the first electrode plate 11 is disposed so as to be clamped and securely held in an intermediate position between the inner-box partitioned-cases 16, and 16a with knobs 24, 24a, formed on the ribs 17, 17a, respectively, thereby making up a first electrolyzed water processing part 25.

In the outer box 9, the electrolytic chamber 8, substantially in the shape of a rectangular parallelepiped, is formed on the inner side thereof by two outer-box partitioned-cases 26, 26a, and flanges 27, 27a, protruding from the edge of an opening of the outer-box partitioned-cases 26, 26a, respectively, are provided with a sealing rib 28, and a sealing groove 28a, respectively, around respective peripheries. By tightening up the flanges 27,27a together with screws 29, 29a, the electrolytic chamber 8 is kept in sealed condition by the agency of a sealant 30 interposed between the sealing rib 28 and the sealing groove 28a.

Inside the outer box 9, a second electrolyzed water outlet 31 and the drinking water inlet 22, in tubular form, respectively, are formed in the upper part and lower part, respectively, on the inner side of one of the outer-box partitioned-cases 26, at the widthwise center CL thereof, and when installing the inner box 7 inside the outer box 9, an inlet/outlet through-hole 32 fitting onto the first electrolyzed water outlet 21 and a drinking water inlet 22a of the inner box 7 and the electrode through-hole 23 fitting onto the electrode bars 15 of the first electrode plate 11 and the second electrode plates 12, 12a, respectively, are bored.

One of the second electrode plates, 12 is installed by fitting the electrode bar 15 thereof into the electrode through-hole 23 formed in the lower part of one of the outer-box partitioned-cases, 26 and subsequently, by fitting the first electrolyzed water outlet 21 and the drinking water inlet 22a of the inner box 7 provided with the first electrode plate 11 on the inner side thereof into the inlet/outlet through-hole 32 while overlaying the inner box 7 over the second electrode plate 12 by fitting the electrode bar 15 of the first electrode plate 11 into the other electrode through-hole 23, and further, the other second electrode plate 12a is overlaid over the inner box 7 by fitting the electrode bar 15 of the other second electrode plate 12a into the other electrode through-hole 23, thereby making up the electrolytic cell 2 by fitting the other outer-box partitioned-case 26a into the outer-box partitioned-case 26.

Reference numeral 33 denotes a water detector. The water detector 33 is provided with screw-shaped detection terminals 34, 34a, made of titanium, penetrated through the bottom of the outer-box partitioned-cases 26 such that the heads of the detection terminals 34, 34a, are disposed inside the electrolytic cell 2. Presence of water can be detected from electrical continuity condition between the detection terminals 34, and 34a, dependent on water filling up the electrolytic cell 2.

Now referring to the clean water cartridge 3, a cartridge main body 37 having an internal space is formed by closing an underside opening of a cylindrical crown-like cap body 35 with a bottom cover 36 in cylindrical shape with a bottom, and a clean water inlet 38 projected downward in tubular shape is formed in the center of the bottom cover 36 while a partition 39 is installed between the cap body 35 and the bottom cover 36, defining a clean water chamber 40 above the partition 39, and a clean water entrance chamber 41 below the partition 39.

Reference numeral 42 denotes an intermediate bottom cover disposed in the clean water entrance chamber 41, and the intermediate bottom cover 42 is formed in oval shape in plan view, projected downward in cylindrical shape with a bottom, and provided with a clean water outlet 43 projected in tubular shape of a diameter smaller than that of the clean water inlet 38 in the center thereof. While the clean water outlet 43 is disposed inside the clean water inlet 38 concentrically therewith, the upper side opening of the intermediate bottom cover 42 is joined with the bottom side of the partition 39, defining a clean water outlet chamber 44 inside the intermediate bottom cover 42.

The clean water outlet chamber 44 is linked with the clean water chamber 40 via a plurality of through-holes, 45, 45a, and so on, bored in the partition 39, and the plurality of the through-holes, 45, 45a, and so on, are attached with a mesh member 46 made of such material as unwoven cloth, nylon mesh, or the like for removal of foreign solids including debris.

The clean water outlet chamber 44 is linked with the clean water chamber 40 also through filter connection ports 47, 47a, opened in the partition 39, and the filter connection ports 47, 47a are connected to the underside opening of cylindrical filters 48, 48a, respectively, furnished therein with hollow thread-like membranes for removal of foreign matters existing in drinking water such as molds, various bacteria, turbidity, and the like, which are micrometers in size.

Reference numeral 49 is a mineral addition part, and the mineral addition part 49 comprises an addition cylinder 50 formed in cylindrical shape with a bottom, having a mineral outlet 51 in tubular shape formed in the bottom thereof, and a water inlet port 52 in the upper part of the side wall thereof. The mineral outlet 51 is connected with a connection port 53 opened in the partition 39 with which the clean water outlet chamber 44 is linked with the clean water chamber 40 while the upper opening of the addition cylinder 50 is kept in close contact with the ceiling of the cap body 35.

An opening 54 for inserting the addition cylinder 50 therethrough is formed in the ceiling of the cap body 35, while a cylindrical section 55 with threads cut on the periphery thereof to fit the circumference of the opening 54 is formed and covered with a cap 56.

Reference numeral 57 is a cylindrical mineral receptacle. The cylindrical mineral receptacle 57 is formed so as to have mesh-like external walls, filled up with calcium glycerophosphate, and placed into the addition cylinder 50 through the upper opening of the addition cylinder 50.

A portion of the addition cylinder 50, below the cylindrical mineral receptacle 57, may also be filled up with calcium sulfite, and the clean water chamber 40 over the partition 39 is also filled up with activated charcoal.

The electrolytic cell 2 is installed in the enclosure case 5 from the back side thereof such that the drinking water inlets 22, 22a are positioned in the lower part thereof while the first electrolyzed water outlet 21 and the second electrolyzed water outlet 31 are positioned in the upper part thereof, and a back side panel 59 of the enclosure case 5 is provided with first couplings 60, 60a, of male type to be fitted into the drinking water inlet 22 and the second electrolyzed water outlet 31, respectively, and also provided with second couplings 61, 61a, of female type into which the drinking water inlet 22a and the first electrolyzed water outlet 21 are to be fitted, respectively, for connection. Further, the back side panel 59 is provided with connectors 62, 62a, of female type into which the electrode bar 15 of the first electrode plate 11, and the second electrode plates 12, 12a, respectively, and the detector terminals 34, 34a are to be fitted. The electrolytic cell 2 is installed by fitting the first electrolyzed water outlet 21, the drinking water inlets 22, 22a, and the second electrolyzed water outlet 31, thereof into the first couplings 60, 60a, the second couplings 61, 61a, and the connectors 62, 62a, respectively.

Figure 21:
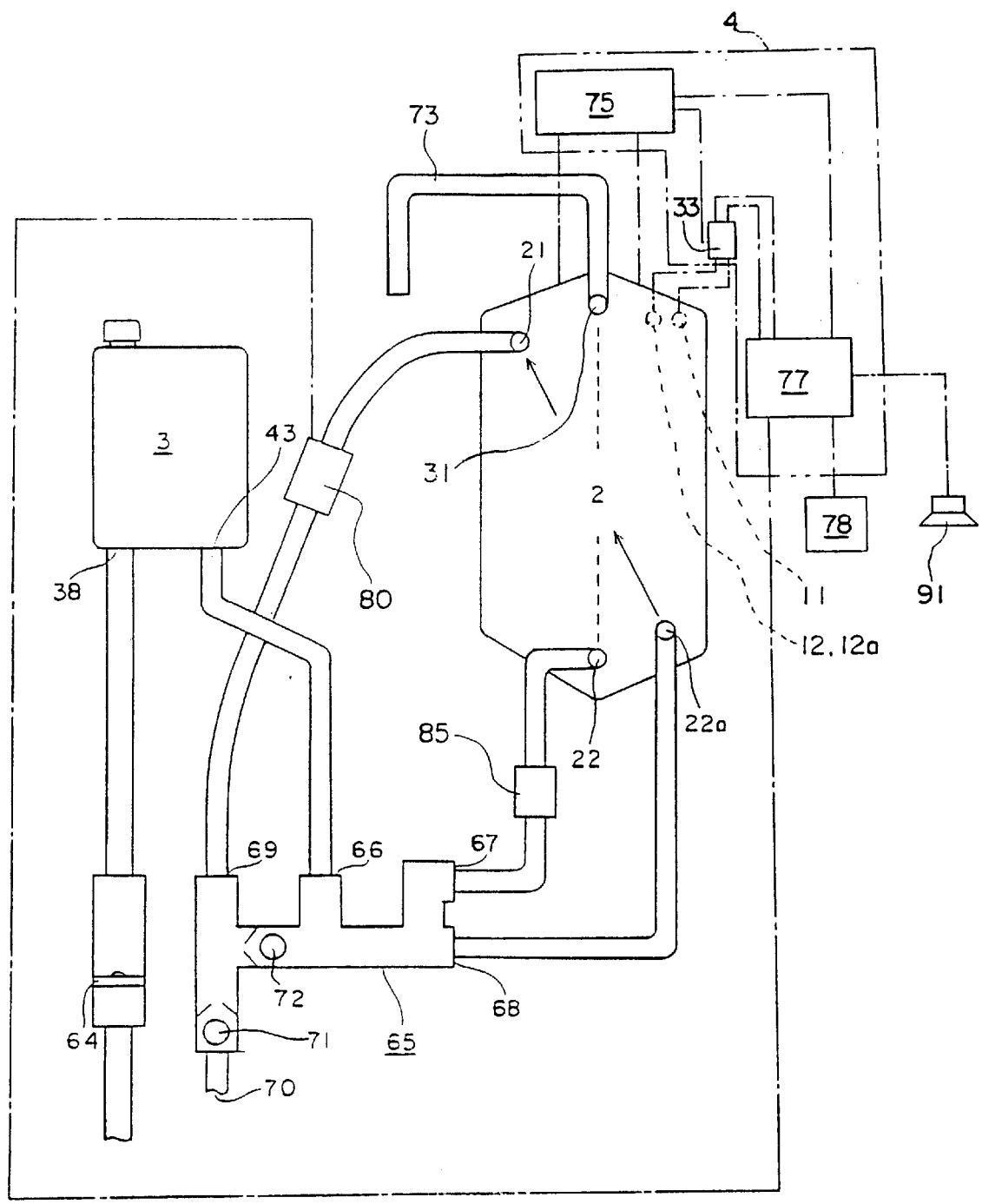
FIG. 21 is a view showing a flow path of the electrolytic ionized water generator.
Figure 22:
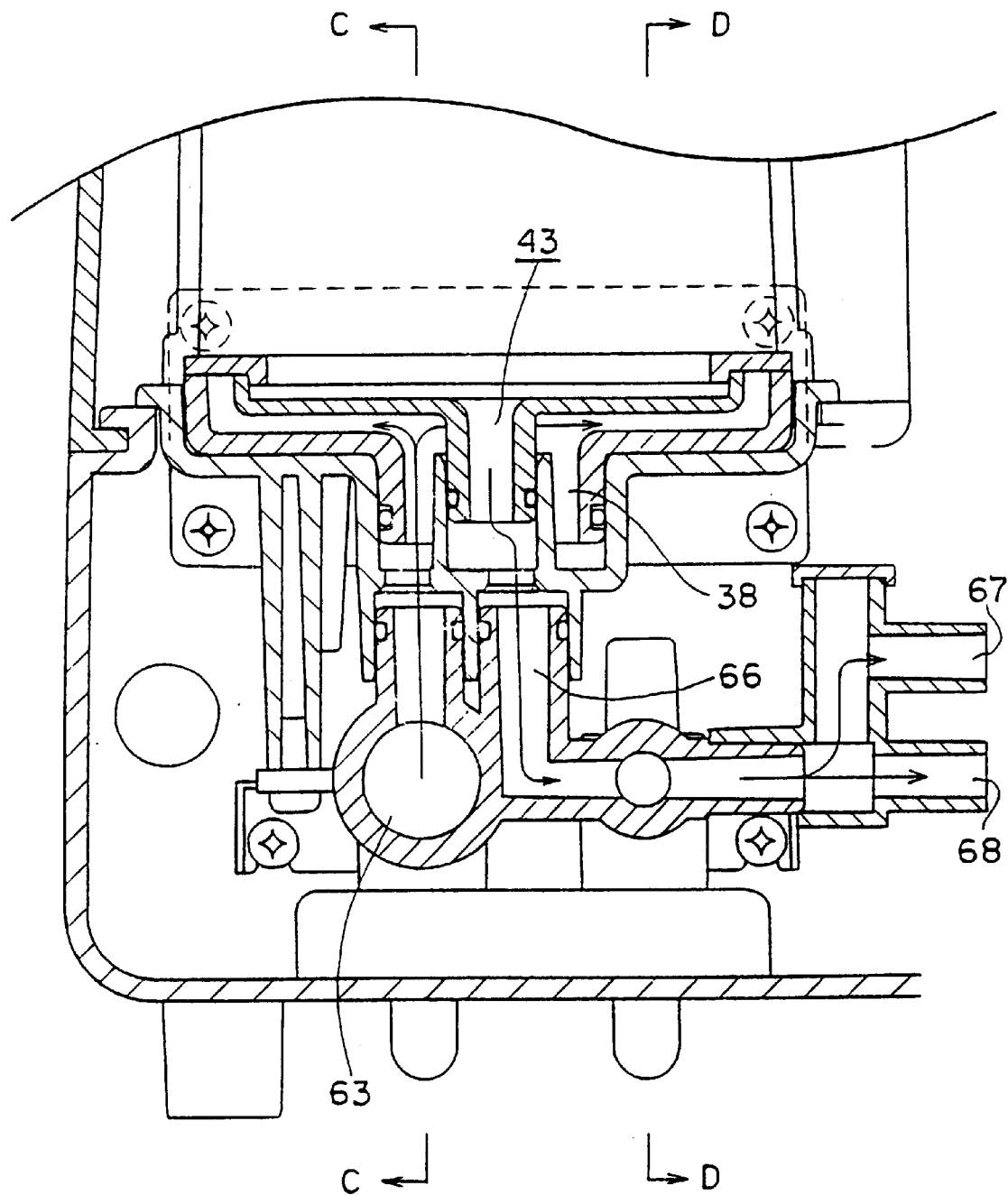
FIG. 22 is a side view showing connection of the clean water cartridge with a diversion connector.
Figure 23:
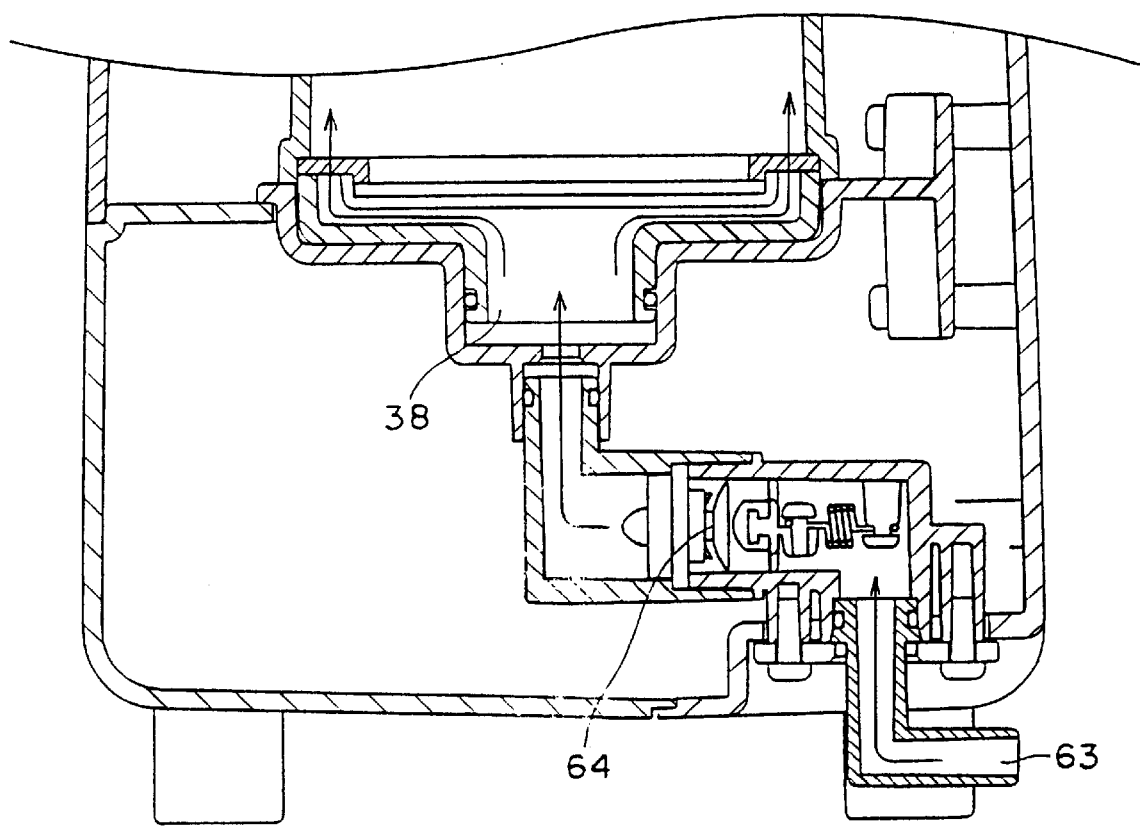
FIG. 23 is a vertical sectional view taken along the line C—C of FIG. 22.
Figure 24:
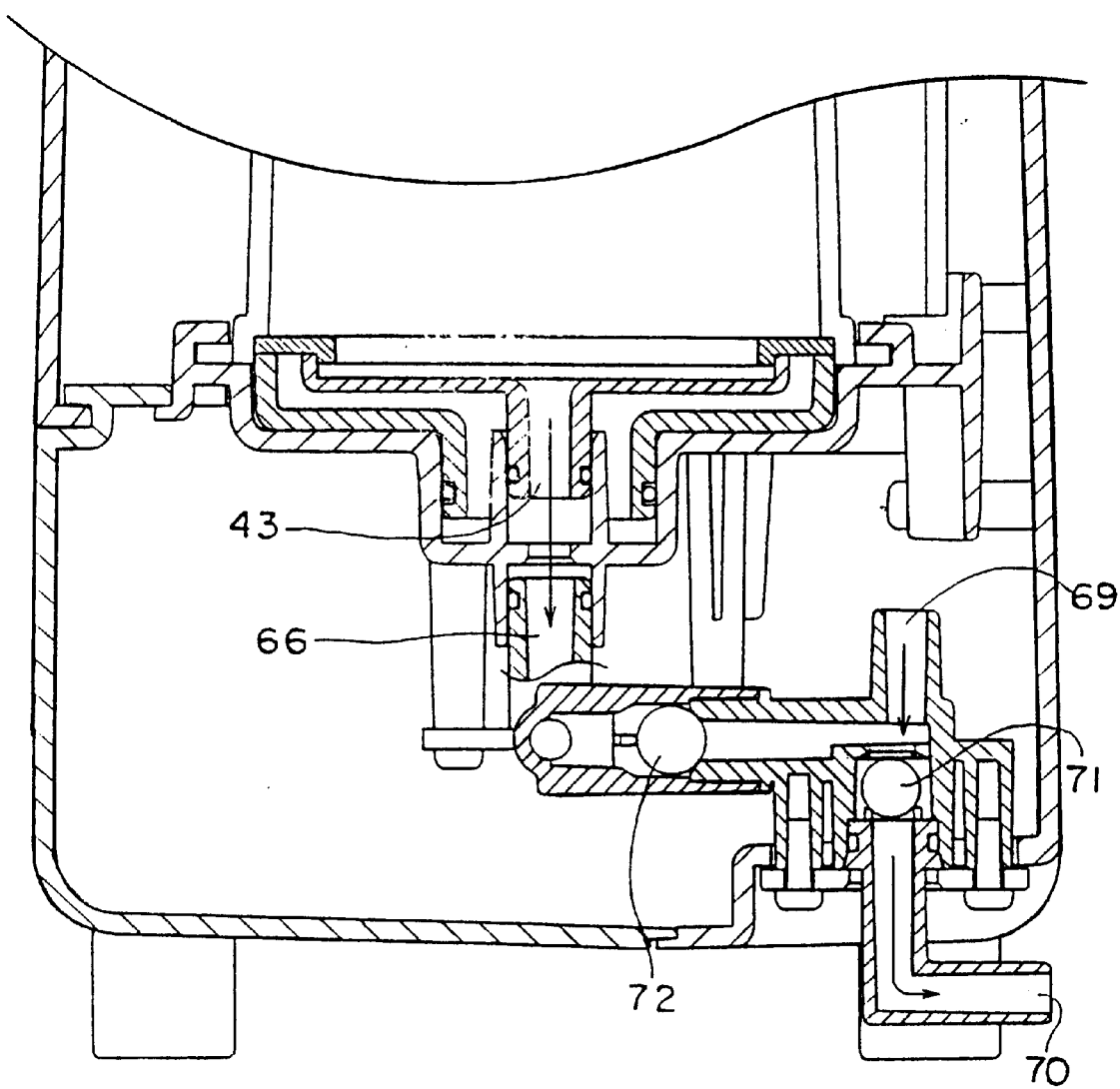
FIG. 24 is a vertical sectional view taken along the line D—D of FIG. 22.

With reference to FIGS. 21 and 23, showing a piping route connecting the electrolytic cell 2 with the clean water cartridge 3, a flow rate regulating valve 64 for adjusting a flow rate of drinking water at a constant level is disposed in a section of piping between a water inlet 63 connected to a city water faucet 63 and the clean water inlet 38 of the clean water cartridge 3 while a diversion connector 65 is disposed in a section of piping between the clean water outlet 43 of the clean water cartridge 3 and the electrolytic cell 2.

The diversion connector 65 has a first inlet 66 connected to the clean water outlet 43 of the clean water cartridge 3 via piping as well as a first outlet 67 and a second outlet 68, linked with the first inlet 66, and the first outlet 67 and the second outlet 68 are connected to the drinking water inlets 22, 22a, respectively, via piping. As shown in FIGS. 1, 21, and 34, a fluid magnetic treatment device 85 for applying a magnetic field acting in a direction perpendicular to the direction of clean water flow is installed between the first outlet 67 and the drinking water inlet 22.

The fluid magnetic treatment device 85 is preferably to be disposed at the position described above although not limited thereto, and may be disposed at any place in a piping route between the water inlet 63 and a faucet pipe 73 described later.

Additionally, the diversion connector 65 has a second inlet 69 connected with the first electrolyzed water outlet 21 via piping to serve as a drainage path of acidic water on the downstream side of the first electrolyzed water outlet 21, and a flow meter 80 is installed between the first electrolyzed water outlet 21 and the second inlet 69. The diversion connector 65 also has a third outlet 70 linked with the second inlet 69, and a check valve 71 for preventing reverse flow from the outlet side to the inlet side is disposed in a section of piping path between the third outlet 70 and the second inlet 69.

In the diversion connector 65, the second inlet 69 is constructed so as to be linkable with the first inlet 66, and a check valve 72 is installed therebetween such that while pressure develops due to supply of drinking water from the first inlet 66, linkage between the second inlet 69 and the first inlet 66 is interrupted, and when pressure declines due to stoppage in supply of drinking water, the linkage is restored.

In FIG. 21, reference numeral 73 is the faucet pipe connected with the second electrolyzed water outlet 31 of the electrolytic cell 3 via the first coupling 60a and piping.

Now referring to the control circuit 4, the first electrode plate 11 and the second electrode plates 12, 12a are connected to a d-c power supply source 75 via an inversion switch 74 while the inversion switch 74 is connected to a forced reset circuit 76 for outputting a command signal at a time when the water detector 33 detects a water level, and the flow meter 80 is activated or deactivated.

An MPU 77, which is a microcomputer (or microprocessing unit), is connected with various components making up the control circuit 4, and has various functions of controlling respective components including a function of inputting an inversion signal to the inversion switch 74 during a period of a given time corresponding to time for draining the electrolytic cell 3 when supply of water to the electrolytic cell 3 is stopped, turning the water detector 33 electrically nonconductive, and the flow meter 80 is deactivated as described hereinafter.

The MPU 77 also has a function of automatically setting a pH value of alkaline ionized water, or acidic water at a constant value depending on different quality of drinking water supplied to the electrolytic cell 3. That is, the MPU 77 controls operation such that conductivity of drinking water is measured by applying an initial voltage between the first electrode plate 11 and the second electrode plates 12, 12a upon start of electrolytic processing, and an electrolyzation voltage thus determined according to the conductivity is applied between the first electrode plate 11 and the second electrode plates 12, 12a.

Further, the MPU 77 has a function of scrolling a letter "ALKALINE" on a letter display panel 78 connected thereto such as a fluorescent display tube, liquid crystal display panel, LED panel, or the like, when a d-c voltage is being applied with the first electrode plate 11 on the positive side and with the second electrode plates 12, 12a on the negative side, a function of scrolling a letter "ACIDIC" when the first electrode plate 11 is on the negative side and the second electrode plates 12, 12a on the positive side, and a function of displaying a letter "pH SETTING" when the pH described above is being set.

The MPU 77 has still other display functions of displaying a letter "PURIFICATION" upon carrying out a purification process by inverting the polarity after an electrolyzation process of drinking water at the predetermined polarity, displaying a letter "CLEAN WATER" when allowing drinking water to simply pass through the clean water cartridge 3 only without the electrolyzation process applied thereto, and displaying a letter "CARTRIDGE REPLACEMENT" when notifying a time for replacement of the clean water cartridge 3.

The MPU 77 has still another function of displaying a letter "xx HOURS TO GO" after the purification process every day to advise the number of hours left before the replacement of the clean water cartridge 3.

Furthermore, the MPU 77 has a function of not only displaying letters but also giving audio messages of the same contents as the letters displayed on the letter display panel 78 by electrically connecting a speaker 91 to the MPU 77.

As shown in FIGS. 25 through 33, the flow meter 80 comprises a casing 102 having an inlet 100 and an outlet 101, formed in the upper part and lower part thereof, respectively, a plurality of vortex plates 103, 103a, and so forth, disposed inside the casing 102, and a rotor 104 installed rotatably below the vortex plates 103, 103a, and so forth.

As shown in FIGS. 28 through 33, the casing 102 comprises a casing main body 105 with open underside, and an underside cover 106 for closing the open underside of the casing main body 105.

The casing main body 105 is provided with the inlet 100 projected from the central region of the upper surface thereof, and a depressed section 107 in the peripheral region thereof, and the innermost portion of the depressed section 107 is configured so as to come close to the rotor 104, and to have an inclined surface 108 in such a way as not to obstruct rotation of the rotor 104. The inclined surface 108 is provided with a transmission window 109 for transmitting an identification element of a detection part 133 as described later, and the transmission window 109 is formed by use of the casing 102 transparent in whole, the inclined surface 108 with transparent central part, or the inclined surface 108 with a thin walled recess in the central part thereof, thereby enabling magnetic fluxes, and like to be transmitted therethrough.

Figure 26:
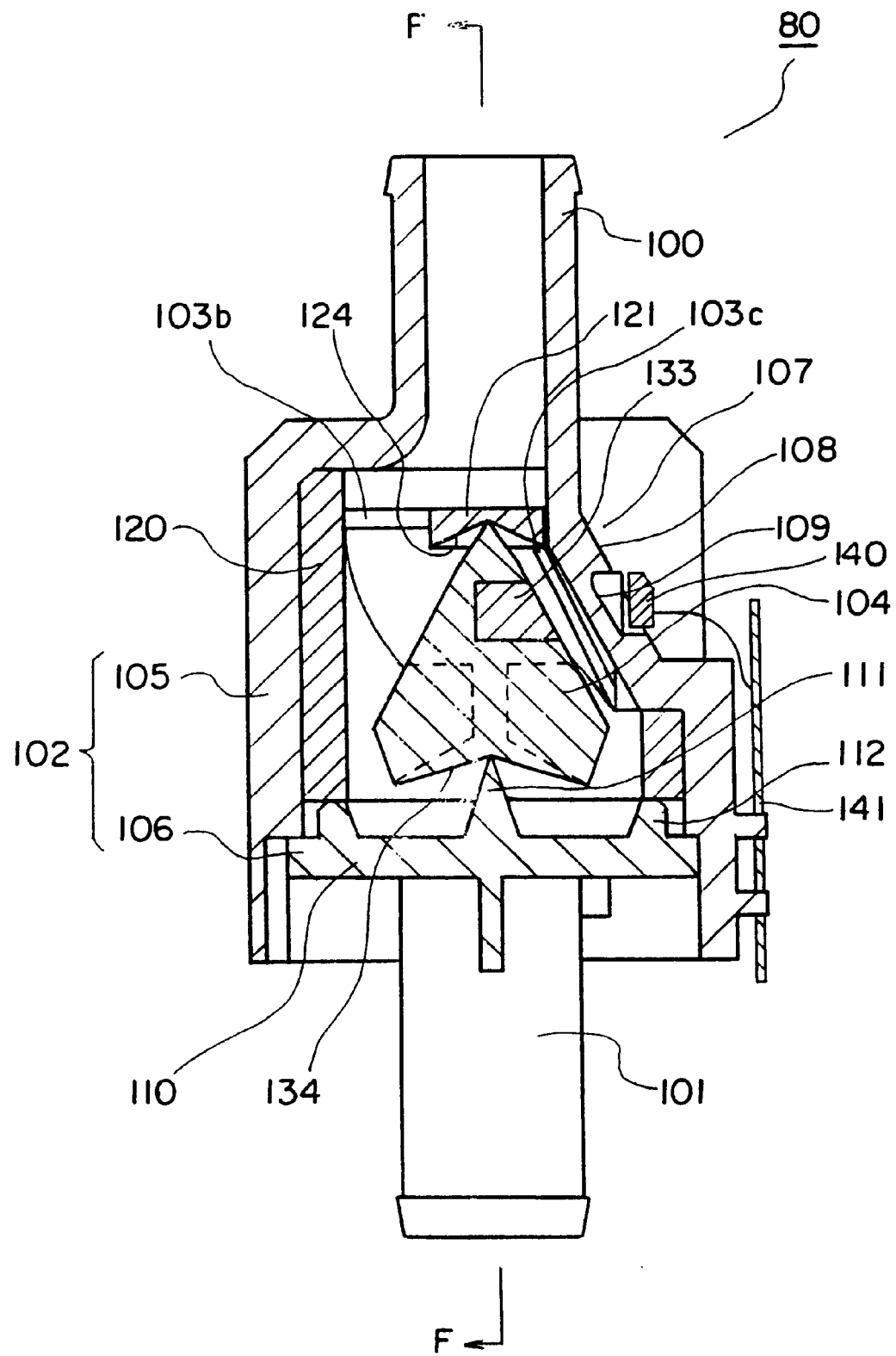
FIG. 26 is a vertical sectional view taken along the line E—E of FIG. 25.
Figure 27:
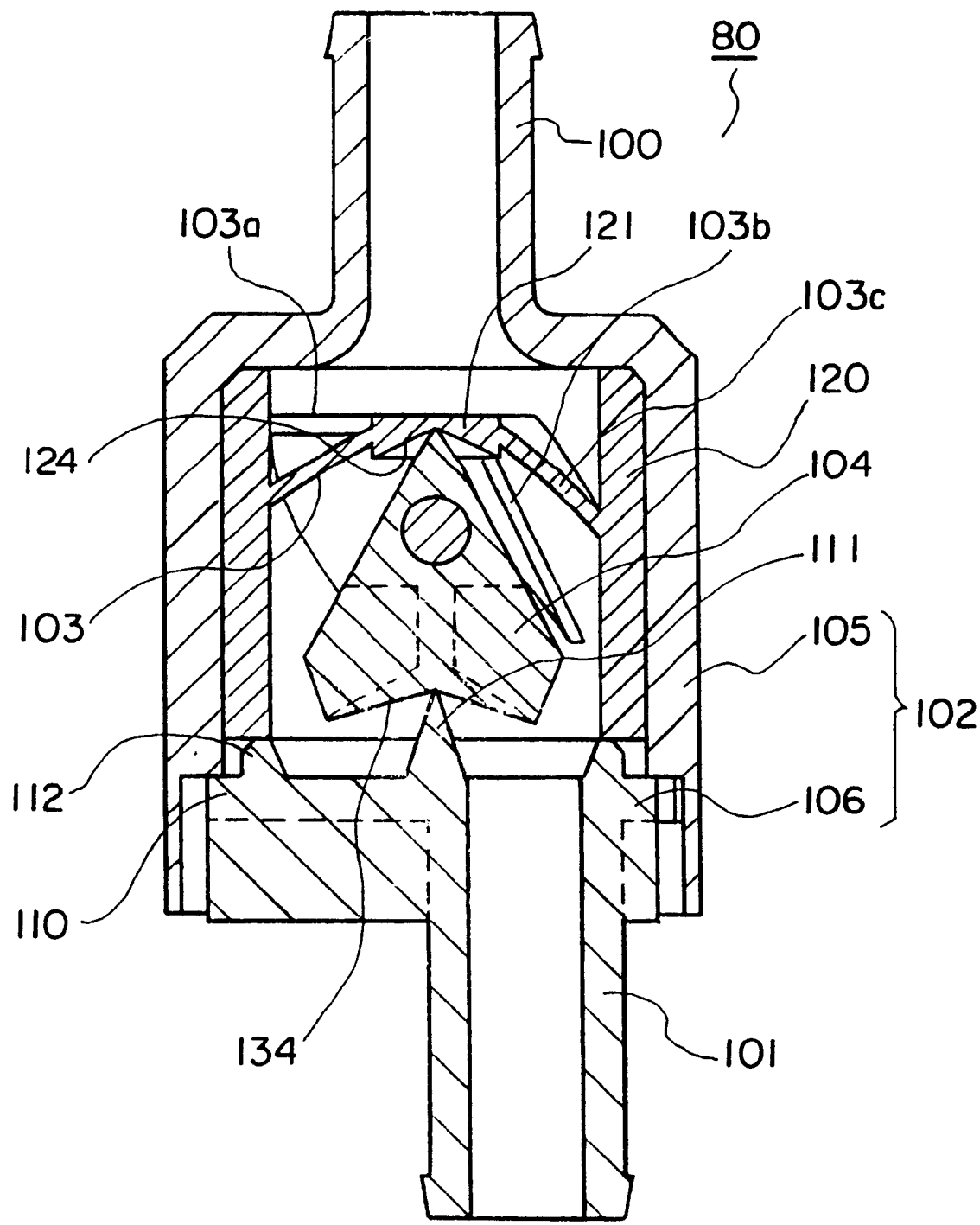
FIG. 27 is a vertical sectional view taken along the line F—F of FIG. 26.
Figure 28:
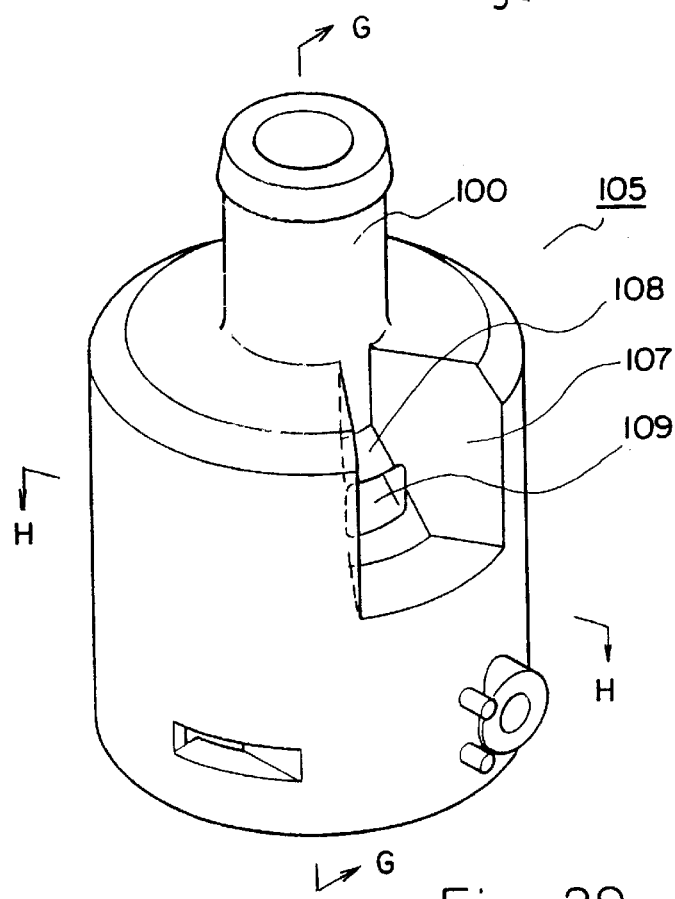
FIG. 28 is a perspective view of a casing main body.
Figure 29:
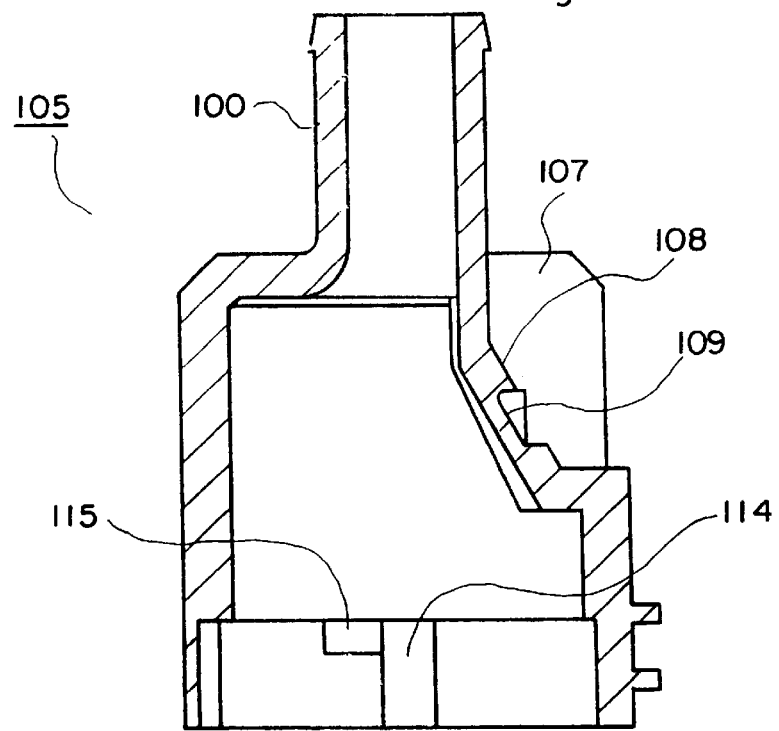
FIG. 29 is a vertical sectional view taken along the line G—G of FIG. 28.
Figure 30:
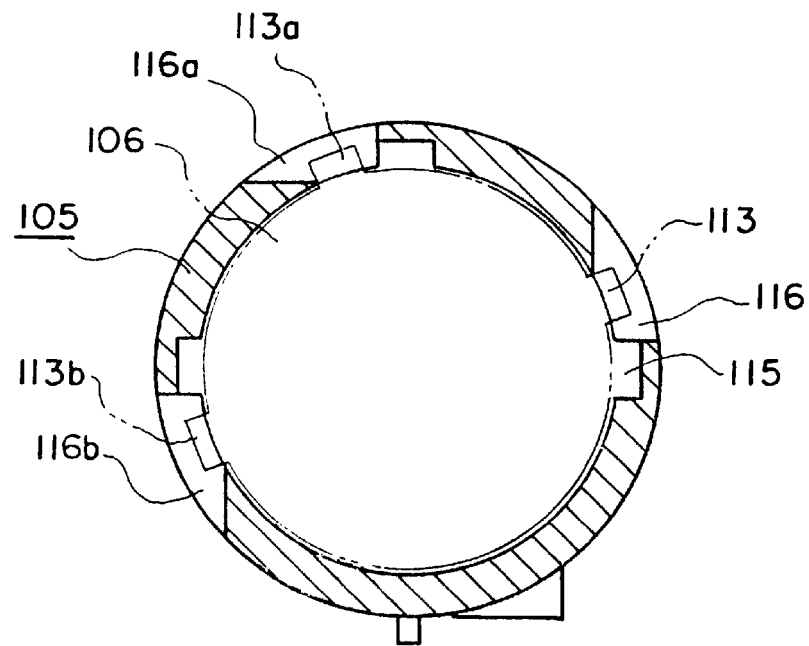
FIG. 30 is a sectional view taken along the line H—H of FIG. 28.
Figure 31:
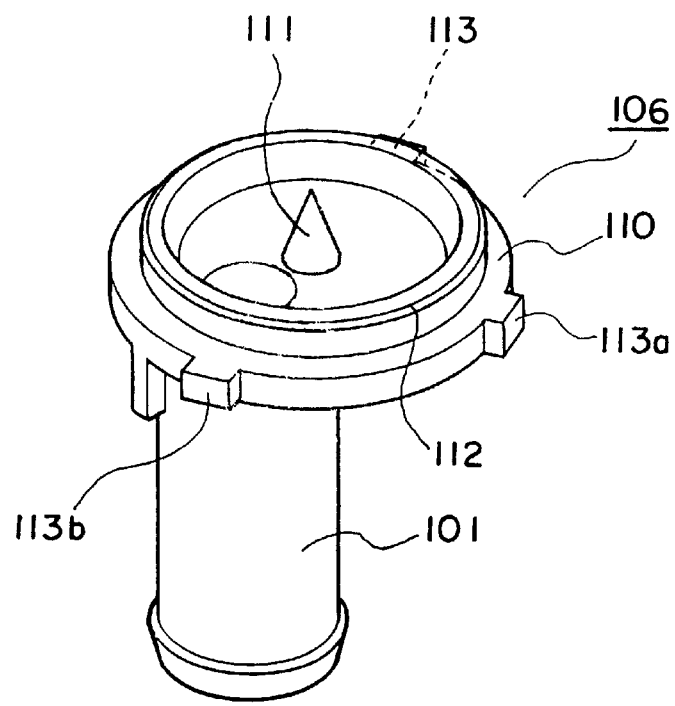
FIG. 31 is a perspective view of an underside cover.

As shown in FIGS. 26, 27, and 31, the underside cover 106 has the outlet 101 projected downward from a region off the center of the downside of a cover main body 110, a lower fixture mount 111 formed in cone-like shape for the rotor 104, projected upward from the center of the upper surface thereof, and a raised ring 112 formed along the periphery of the cover main body 110.

Further, as shown in FIGS. 26, 27, 29, and 30, the underside cover 106 has holding protuberances 113, 113a, 113b, projected on the periphery of the cover main body 110 while the casing main body 105 has holding grooves 116, 116a, 116b, each consisting of a vertical groove 114 and a transverse groove 115 formed in a direction at a right angle with the top edge of the vertical groove 11, cut on the inner periphery at the bottom thereof. By fitting the holding protuberances 113, 113a, 113b, into the vertical groove 114 of the holding grooves 116, 116a, 116b, respectively, from the underside, and turning the underside cover 106 upon the former reaching the top edge of the vertical groove 114, the holding protuberances 113, 113a, 113b are transferred into the transverse groove 115, respectively, a cylinder 120 described later is pushed up by the raised ring 112, and securely held while the underside cover 106 is fixedly attached to the casing main body 105.

Figure 32:
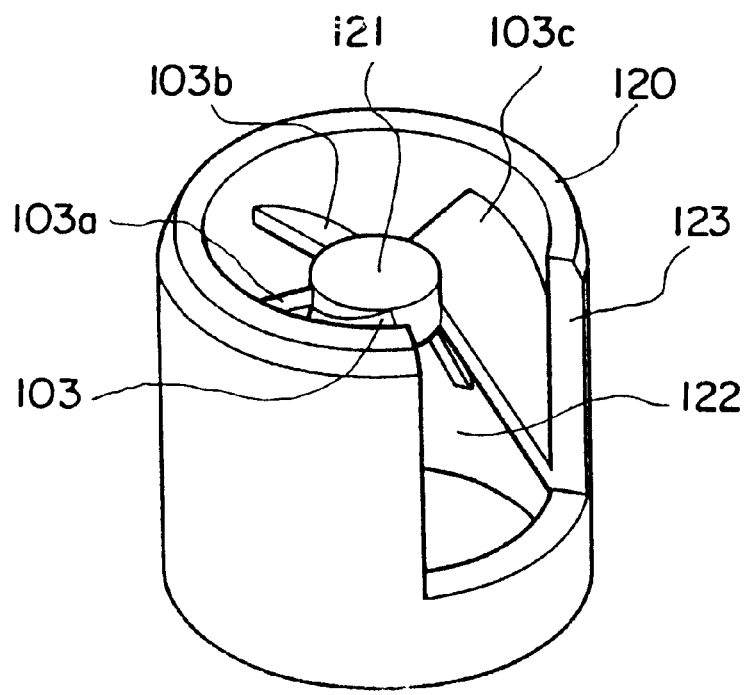
FIG. 32 is a perspective view of vortex plates installed in a cylinder.

As shown in FIGS. 26, 27, and 32, the vortex plates 103, 103a, 103b, and 103c are formed on the inner peripheral surface of the cylinder 120 housed in the casing 102, and the outer edge of the vortex plates 103, 103a, 103b, and 103c, respectively, is fixedly attached to the cylinder 120 while the inner edge thereof is fixedly attached to an upper fixture mount 121. A sufficient space for housing the rotor 104 under the vortex plates is provided by a difference in height between the upper and lower ends of the respective vortex plates, gradually increasing towards the inner periphery of the cylinder 120.

Each of the vortex plates 103, 103a, 103b, and 103c has a side on the top, horizontally disposed, and a lower side inclined downward, and above the lower side of one of the vortex plates, the side on the top of an adjacent one thereof is disposed.

Further, by enlarging a spacing 122 between a pair of adjacent vortex plates among the vortex plates 103, 103a, 103b, and 103c, and forming a cutout 123, corresponding to the spacing 122, in the cylinder 120, the opposite sides of the cutout 123 are butted against the inner surfaces on the opposite sides of the depressed section 107.

The upper fixture mount 121 has an underside with a cone-shaped concave surface 124, and serving as a support for the tip of the rotor 104.

Figure 33:
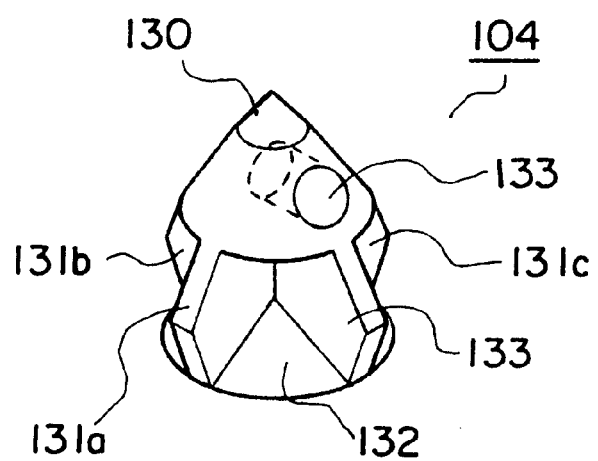
FIG. 33 is a perspective view of a rotor.

As shown in FIGS. 26, 27, and 33, the rotor 104 comprises a head 130 with a pointed top end, blades 131, 131a, 131b, and 131c, formed radially under the head 130, and a bottom 132 formed beneath the blades 131, 131a, 131b, and 131c.

A detection part 133 for use in detection by a sensor 140 described later is provided in the side of the head 130, and the detection part 133 is formed by externally exposing a magnetic body embedded in the head 130, or by painting a part of the side surface of the head 130 in a different color, serving as a particular point detectable by the sensor 140.

The blades 131, 131a, 131b, and 131c have the outer surface, inclined downward in the external direction, and the bottom 132 formed so as to gradually increase the width of the blades 131, 131a, 131b, and 131c in the downward direction has a bottom surface, making up a cone-shaped concave surface 134.

The rotor 104 is rotatably held by positioning the tip of the head 130 in the cone-shaped concave surface 124 of the upper fixture mount 121, and also positioning the lower fixture mount 111 of the underside cover 106 in the cone-shaped concave surface 134 of the rotor 104.

Figure 25:
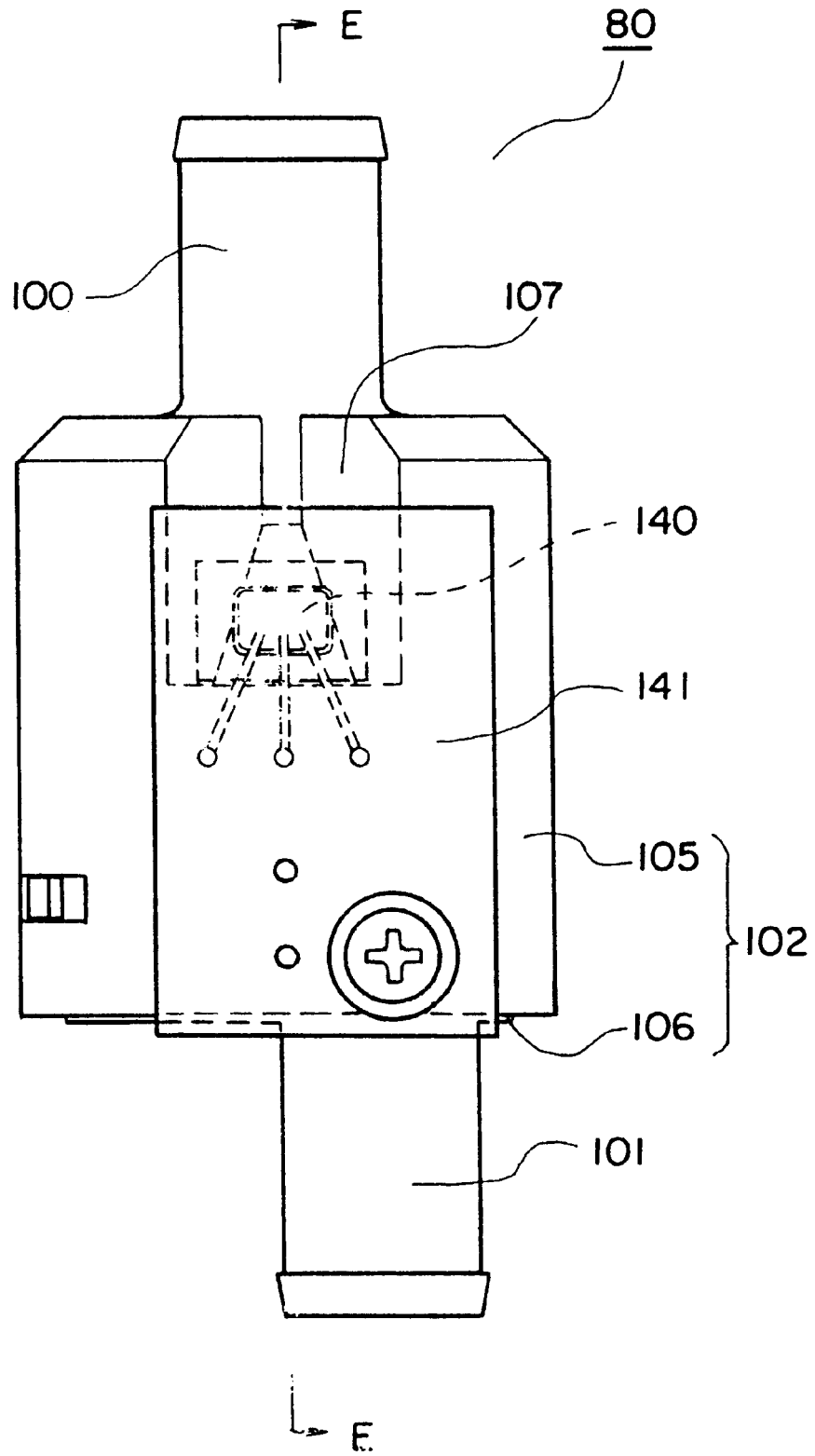
FIG. 25 is an elevation of a flow meter.

In FIG. 25, reference numeral 140 is the sensor disposed on the outside of the transmission window 109, for detecting the identification element of the detection part 133, transmitted through the transmission window 109, and 141 is a circuit for connection of the sensor 140, through which detection signals from the sensor 140 are turned into electric signals and sent out to the MPU 77.

Now operation of the electrolytic ionized water generator according to the invention is described hereinafter.

When drinking water is supplied from a city water faucet to the water inlet 63 of the enclosure case 5, a flow rate is first adjusted at a constant rate by the flow rate regulating valve 64, and clean water is supplied into the electrolytic cell 2 through the ring water inlets 22, 22a via the clean water cartridge 3, and the diversion connector 65.

Subsequently, when the electrolytic cell 2 is filled up with clean water up to the water detector 33, which is detected by the water detector 33, and the flow meter 80 is activated by clean water flowing out of the electrolytic cell 2, the forced reset circuit 76 is energized by the MPU 77, and a forced feedback signal from the forced reset circuit 76 is inputted to the inversion switch 74, thereby inverting the polarity of voltage applied to the first electrode plate 11, and the second electrode plates 12, 12a, respectively.

Thereafter, conductivity of clean water is measured after applying an initial voltage between the first electrode plate 11 and the second electrode plates 12, 12a through the MPU 77, and by setting an electrolyzation voltage at which a set pH value of alkali ionized water or acidic water is obtained on the basis of a measured value of the conductivity, clean water flowing inside the first electrode chamber 6 and the second electrode chamber 10 is electrolyzed after applying the voltage between the first electrode plate 11 and the second electrode plates 12, 12a, discharging electrolyzed water of the set pH value from the second electrolyzed water outlet 31 and the first electrolyzed water outlet 21. During this step of processing, the letter "pH SETTING" is displayed on the letter display panel 78.

In case of the quality of drinking water undergoing a sudden change, an electrolyzation voltage is automatically changed following change in conductivity so as to be able to discharge electrolyzed water of the set pH value, but in case of significant change in electrolyzation voltage taking place, there will be times when the letter "pH SETTING" is shown on the letter display panel 78 to invite attention.

With reference to inversion of the polarity of the first electrode plate 11 and the second electrode plates 12, 12a, respectively, at the outset of electrolytic processing by the agency of the forced reset circuit 76, if supply of water to the electrolytic cell 2 is stopped in the normal electrolytic processing condition, the flow meter 80 stops, and clean water in electrolytic cell 2 is discharged from the drinking water inlets 22, 22a in reverse flow, lowering a water level. The water detector 33, upon becoming electrically nonconductive, confirms stoppage of water supply, and the MPU 77, upon detecting this, inputs a signal to the inversion switch 74 so as to supply water and invert the predetermined polarity for electrolytic processing during a predetermined time period corresponding to a time of the water discharge, causing the polarity of the first electrode plate 11 and the second electrode plates 12, 12a, respectively, to be inverted with the result that purification of water is executed every time electrolytic processing is carried out, displaying "PURIFICATION" on the letter display panel 78 during the period, and removal of scales and the like, and sterilization inside the electrolytic cell 2 are implemented, preventing misuse of electrolyzed water contaminated with scales and the like.

If voltage is applied with the first electrode plate 11 on the positive side and with the second electrode plates 12, 12a on the negative side during electrolytic processing, acidic water is discharge from the first electrolyzed water outlet 21, and alkali ionized water from the second electrolyzed water outlet 31. Naturally, it is possible to turn conversely the chemical property of electrolyzed water discharged from the first electrolyzed water outlet 21 against that of electrolyzed water discharged from the second electrolyzed water outlet 31 by inverting the polarity of the first electrode plate 11 and the second electrode plates 12, 12a, respectively. This is made possible because titanium is used as material for the first electrode plate 11 and the second electrode plates 12, 12a.

Now, trash, red rust, algae, and the like contained in drinking water passing through the clean water cartridge 3 are first removed by the mesh member 46 attached to the through-holes 45, 45a, and the like of the partition 39. and subsequently, while drinking water flows upward keeping in contact with the activated charcoal 58, odor, bleaching powders, organic substance, and the like are removed by the agency of the activated charcoal 58. Thereafter, a portion of drinking water flows into the addition cylinder 50 of the mineral addition part 49 through the water inlet port 52 of the addition cylinder 50, and comes in contact with calcium glycerophosphate in the cylindrical mineral receptacle 57 housed inside the addition cylinder 50, causing calcium glycerophosphate to be contained in clean water while the greater part of drinking water other than the portion thereof described above is allowed to flow into the filters 48, 48a through upper openings thereof, and pass through the hollow thread-like membranes, whereupon molds, various bacteria, turbidity, micron(micrometer) in size, are removed by the hollow thread-like membranes, thereby delivering clean water to the electrolytic cell 2 so that alkaline ionized water good for health and tasty is generated.

With reference to the diversion connector 65, clean water supplied from the clean water cartridge 3 flows into the drinking water inlets 22,22a of the electrolytic cell 2 via the first inlet 66, the first outlet 67, and the second outlet 68. In this stage of operation, linkage between the first inlet 66 and the second inlet 69 is cut off by the check valve 72 reacting to pressure developing on the side of the first inlet 66 while upon stoppage of supply of water to the first inlet 66, the pressure on the side of the first inlet 66 is gone, thus restoring linkage between the first inlet 66 and the second inlet 69 which has been cut off by the check valve 72 with the result that clean water flowing out of the drinking water inlets 22,22a in reverse flow is discharged externally via the first outlet 67, the second outlet 68, and the third outlet 70.

In the course of electrolytic processing in the electrolytic cell 2, with the first electrode plate 11 on the positive side and the second electrode plates 12, 12a on the negative side, talking out alkaline ionized water from the second electrolyzed water outlet 31, and acidic water from the first electrolyzed water outlet 21, clean water passing through the first electrode chamber 6 comes in contact with the ribs 17, 17a, and clean water flowing from the drinking water inlet 22 to the first electrolyzed water outlet 21 moves in an diagonal direction since the drinking water inlet 22 and the first electrolyzed water outlet 21 are disposed at positions diagonally opposite to each other. On the other hand, clean water passing through the second electrode chamber 10 flows without any resistance, and moves simply upward in a straight direction, thereby improving electrolyzation efficiency at which alkaline ionized water is generated, and also enhancing ion transmission efficiency since the diaphragm 19 is disposed close to the second electrode plates 12, 12a so that alkaline ionized water electrolyzed at a high potential can be generated.

Clean water before flowing into the electrolytic cell 2 contains scale-forming constituents in the state of ions by the agency of the fluid magnetic treatment device 85, and sent out into the electrolytic cell 2 without precipitating scales.

When electrolytic processing is underway with the first electrode plate 11 on the positive side and the second electrode plates 12, 12a on the negative side, the control circuit 4 causes the letter display panel 78 to display letter "ALKALINE" being scrolled, while when electrolytic processing is underway with the first electrode plate 11 on the negative side and the second electrode plates 12, 12a on the positive side, the control circuit 4 causes the letter display panel 78 to display letter "ACIDIC" being scrolled, simultaneously giving audio message of the same contents as the letter via the speaker 90 in both cases.

In case a flow rate of clean water delivered from the clean water cartridge 3 declines due to obstacles in the way of passage thereof caused by clogging of the meshes of the filters, an input value from the flow meter 80 sent out to the MPU 77 from time to time changes, automatically changing an electrolyzation voltage such that alkaline ionized water of pH in the range of 9 to 10 is continuously generated.

The pressure of water supplied varies depending on a degree through which the valve of a faucet is turned, and in case the pressure is higher than a water pressure set by the MPU 77, water flow is reduced to a constant flow rate by the flow rate regulating valve 64 while in case the pressure is too low, a flow rate as measured by the flow meter 80 is inputted to the MPU 77, automatically changing an electrolyzation voltage so that alkaline ionized water of pH the range of 9 to 10 can be generated.

More specifically, since a flow rate and quality of clean water delivered from the clean water cartridge 3 to the electrolytic cell 2 is measured from time to time by the flow meter 80 and electrical conduction condition between the first electrode plate 11 and the second electrode plates 12, 12a, and results of such measurements are inputted to the MPU 77 of the control circuit 4, pH alkaline ionized water can be maintained at the set value even though supply of drinking water undergoes changes depending on a degree through which the valve of a faucet is turned every time the faucet is manipulated, or a flow rate of clean water gradually decreases over time due to clogging of meshes in the clean water cartridge 3, and the like, in which case an electrolyzation voltage declines corresponding to such a decrease in the flow rate. Hence, alkaline ionized water generated by the electrolytic ionized water generator 1 according to the invention can be put to use as water fit to drink all the time with a sense of security.

With the electrolytic ionized water generator 1 according to the invention, a pH value of alkaline ionized water generated thereby is not limited to the range of 9 to 10, that is, alkaline ionized water of a constant pH value can always be generated regardless of a flow rate and quality of water supplied.

In case a flow rate of drinking water undergoing a sudden change, an electrolyzation voltage is automatically changed so as to be able to discharge electrolyzed water of the set pH value, but in case of significant change in the electrolyzation voltage taking place, there will be times when the letter "pH SETTING" is shown on the letter display panel 78 to invite attention.

Further, with the electrolytic ionized water generator 1 according to the invention wherein complex processing as described above is automatically executed, and various steps of processing is controlled by the control circuit 4, it is important to display whether or not electrolyzed water discharged from the electrolytic ionized water generator 1 is clean water before a predetermined pH value has been attained, ionized water of a desired polarity, clean water, or waste water after purification. Otherwise, the electrolyzed water can not be utilized with a sense of security. Accordingly, very step of processing is displayed simultaneously on the letter display panel 78 together with an audio message issued ensuring that a user can decide whether or not water flowing out of the electrolytic ionized water generator 1 is fit to drink Further, alkaline ionized water generated by the electrolytic ionized water generator 1 equipped with the fluid magnetic treatment device 85 has an ability to stabilize a redox potential (ORP) thereof over longer time than for alkaline ionized water generated by an electrolytic ionized water generator without the fluid magnetic treatment device 85 equipped, and therefore, fresh alkaline ionized water can be supplied long after generation thereof.

This is presumably due to a phenomenon that by applying a magnetic field to clean water before flowing into the electrolytic cell 3 with the fluid magnetic treatment device 85, electrons of water are lined up once and remain stable and consequently, bonding of the electrons are maintained for a while even after a d-c voltage is applied in the electrolytic cell 2, slowing down neutralization.

In the low meter 80, acidic water flowing into the casing 102 via the inlet 100 is ted into vortical current inside the casing 102 by the vortex plates 103, 103a, and so forth, rotating the rotor 104.

The identification element from the detection part 133, passing through the transmission window 109, is detected by the sensor 140, and a flow rate is measured form the number of revolutions thereof.

To sum up, the electrolytic ionized water generator according to the invention provides, for example, the following significant merits:

Besides capability thereof whereby any change in the flow rate or gradual decrease in the flow rate over time due to clogging of the mesh, and the like occurring in the clean water cartridge 3, can be measured by the flow meter 80 every time such change occurs, since the flow meter 80 is disposed in the discharge path of acidic water without containing such constituents as calcium, magnesium, and the like, adherence of the constituents such as calcium, magnesium, and the like to the flow meter 80 can be prevented, ensuring accurate measurement of the flow rate;

Since means for measuring conductivity of clean water is designed such that measurement is made by applying a low voltage between the first electrode plate 11 and the second electrode plates 12, 12a prior to electrolytic processing with the use of the MPU 77, electrolytic processing and measurement of conductivity can be made with the first electrode plate 11 and the second electrode plates 12, 12a, in the state as described, enabling simplification of the control circuit 4;

Since an electrolyzation voltage is applied between the first electrode plate 11 and he second electrode plates 12, 12a, upon detection of electrical continuity in the water detector 33 and of operation of the flow meter 80, or purification is executed by activating the inverse switch 74 upon detection of electrical discontinuity in the water detector 33 and of stoppage of the flow meter 80, the presence of water is checked at two spots, thereby preventing application of a voltage between the first electrode plate 11 and the second electrode plates 12, 12a, for a length of time longer than necessary so that power consumption is saved;

Since operation condition is expressed by an audio message by connecting the speaker 91 to the MPU 77, it is possible to let a user, particularly, visually handicapped user know the present condition of operation, preluding with certainty an accident wherein acidic water is drunk by mistake a happened in the past;

Since the flow meter 80 comprises the casing 102 having the inlet and the outlet in the upper part and lower part thereof, respectively, the plurality of vortex plates 103, 103a, and so forth, disposed inside the casing 102, and the rotor 104 installed freely rotatably below the vortex plates 103, 103a, and so forth, and the rotor 104 is provided with the detection part 133 while the casing 102 is provided with the transmission window 109 for transmitting the identification element of the detection part 133, and the sensor 140 for detecting the identification element of the detection part 133 is installed on the outside of the transmission window 109, spacing between the rotor 104 and the casing 102 becomes wider with the rotor 104 being rotated by vortex generated between the rotor 104 and the casing 102 with the result that scales, even if precipitated, do not get jammed between the rotor 104 and the casing 102, and steady operation of the flow meter 80 is ensured, enabling accurate measurement of the flow rate;

With the fluid magnetic treatment device 85 installed in the piping route, magnetically treated water capable of inhibiting precipitation of scales is passed through the piping, preventing adherence of scales to the piping; and Since ions in alkaline ionized water thus generated are in a stable state and able to inhibit redox reaction, the alkaline ionized water left unused for a long time can maintain substantially same quality as that of the alkaline ionized water immediately after generation.

What is claimed is:

1. An electrolytic ionized water generator, comprising:

an electrolytic cell for generating alkaline ionized water and acidic water by means of electrolytic processing of clean water passing through a flow path partitioned with diaphragms by applying a d-c voltage, said electrolytic cell having first and second electrode plates therein, and a discharge path for acidic water;

a clean water cartridge for cleaning water supplied to the electrolytic cell;

a flow meter connected to said discharge path; and a control circuit for controlling a voltage applied to the electrolytic cell, said control circuit including a water detector having a pair of detection terminals disposed in an upper part of the electrolytic cell, an inversion switch for connecting the first electrode plate and the second electrode plate to a d-c power source, a forced reset circuit for resetting the polarity of the voltage applied to the first electrode plate and the second electrode plate, in inverted state, upon detection of electric continuity by the water detector, and said control circuit also including a MPU for (1) measuring conductivity of clean water, (2) controlling time for use and replacement of the clean water cartridges, (3) by applying a voltage of reverse polarity with the use of the inversion switch to clean the inside of the electrolytic cell, (4) controlling passage of clean water through the flow path without applying a voltage to the first electrode plate and the second electrode plate, (5) determining through computation an electrolyzation voltage by connecting with the flow meter, and (6) comparing a measured value of the flow meter and the conductivity value of the clean water with set values already inputted into the control circuit for flow rate and water quality, respectively, such that an electrolytic ionized water of a constant pH value is generated.

2. An electrolytic ionized water generator according to claim 1, wherein in the MPU includes means for measuring conductivity of clean water, which performs a measurement after applying a low voltage to the first electrode plate and the second electrode plate prior to the electrolytic processing.

3. An electrolytic ionized water generator according to claim 1, wherein the control circuit includes means for applying an electrolyzation voltage between the first electrode plate and the second electrode plates upon on detection of electrical continuity by the water detector and of operation of the flow meter.

4. An electrolytic ionized water generator according to claim 1, wherein the MPU includes means for purifying water which actuates the inverse switch upon detection of electrical discontinuity by the water detector and of stoppage of the flow meter.

5. An electrolytic ionized water generator according to claim 1, wherein the control circuit includes a speaker and said MPU includes means for broadcasting an audio message from the speaker.

6. An electrolytic ionized water generator according to claim 1, wherein the flow meter comprises a casing having an inlet and an outlet in the upper part and lower part thereof, respectively, a plurality of vortex plates disposed inside the casing, and a rotor installed freely rotatably below the vortex plates, and the rotor is provided with a detection part while the casing is provided with a transmission window for transmitting an identification element of the detection part, and a sensor for detecting the identification element of the detection part is installed on the outside of the transmission window.

7. An electrolytic ionized water generator according to claim 1, wherein a fluid magnetic treatment device is installed in a piping route for the water flow.

8. An electrolytic ionized water generator for generating alkaline ionized water and acidic water from a water source, comprising:

a d-c power source, a water cleaning cartridge for cleaning water from a water source, an electrolytic cell having a plurality of diaphragms partitioning said cell into a flow path, said flow path having a water inlet receiving water from said water cleaning cartridge, an acidic water outlet and an alkaline ionized water outlet, said cell including first and second electrode plates in said flow path, and a water presence detector in an upper part of said cell to detect a select minimum level of water in said cell, said water presence detector having two spaced-apart terminals extending into said flow path, a flow meter fluidly connected to said acidic water outlet, and a control circuit for controlling the voltage applied to said electrolytic cell, said control circuit being connected to said d.c. power source, said water presence detector to detect electrical continuity between said terminals which occurs when the water in said flow path electrically connects said terminals and said flow meter to detect water flow through said flow meter, said control circuit being adapted to apply an inversed polarity voltage across said first and second electrode plates to measure the conductivity of the water in said electrolytic cell, said control circuit being adapted to calculate an electrolyzation voltage to achieve a set pH level in one of said water outlets based on the measured conductivity, said control circuit being adapted to apply said electrolyzation voltage across said first and second plates to electrolyze the water in said electrolytic cell and output electrolyzed water through one of said water outlets, said control circuit being adapted to sense that said electrolytic cell is not full by said water presence detector being nonconductive, and said control circuit being adapted to reverse the polarity of a voltage applied across said first and second electrode plates to purify said electrolytic cell.

9. An electrolytic ionized water generator for generating ionized water from a water source, comprising:

a water cleaning cartridge for filtering water from a water source;

an electrolytic cell connected to said water cleaning cartridge and being adapted to receive filtered water therefrom, said cell having an interior chamber adapted to store water therein for electrolysis and first and second electrode plates mounted in said interior chamber;

a water presence detector mounted to said electrolytic cell and including a pair of spaced apart terminals extending into an upper part of said chamber, and a control circuit for controlling the voltage applied to said first and second electrode plates, said control circuit being connected to said water presence detector to detect electrical continuity between said terminals which occurs when the water in said chamber electrically connects said terminals, with electrical continuity detected said control circuit including means for applying an electrolyzation voltage to said first and second plates to achieve a set pH level in water output from said chamber, with electrical discontinuity detected said means for applying applies an inversed polarity voltage to said first and second plates to clean said electrolytic cell.

* * * * *